US010530051B2

(12) United States Patent
Dalmazzo

(10) Patent No.: US 10,530,051 B2
(45) Date of Patent: Jan. 7, 2020

(54) ANTENNA ALIGNMENT DEVICE AND METHODS FOR ALIGNING ANTENNAS

(71) Applicant: Enzo Dalmazzo, Miami, FL (US)

(72) Inventor: Enzo Dalmazzo, Miami, FL (US)

(73) Assignee: 3Z Telecom, Inc., Miramar, FL (US)

(*) Notice: Subject to any disclaimer, the term of this patent is extended or adjusted under 35 U.S.C. 154(b) by 131 days.

(21) Appl. No.: 15/422,033

(22) Filed: Feb. 1, 2017

(65) Prior Publication Data
US 2017/0149129 A1    May 25, 2017

Related U.S. Application Data

(63) Continuation-in-part of application No. 14/483,790, filed on Sep. 11, 2014, now Pat. No. 9,711,842, which
(Continued)

(51) Int. Cl.
G01S 19/14    (2010.01)
H01Q 3/08    (2006.01)
(Continued)

(52) U.S. Cl.
CPC .............. H01Q 3/08 (2013.01); G01S 19/14 (2013.01); H01Q 1/125 (2013.01); H01Q 1/243 (2013.01); H01Q 1/42 (2013.01)

(58) Field of Classification Search
CPC .......... H01Q 3/08; H01Q 1/125; H01Q 1/243; H01Q 1/42; G01S 19/14
See application file for complete search history.

(56) References Cited

U.S. PATENT DOCUMENTS 2,979,676 A    4/1961    Rueger
4,101,892 A    7/1978    Alford
(Continued)

FOREIGN PATENT DOCUMENTS

DE    102005040414 A1    3/2007
WO    2011080742 A1    7/2011
WO    2015138000 A1    9/2015

OTHER PUBLICATIONS

Ojaroudiparchin et al., "Multi-Layer 5G Mobile Phone Antenna for Multi-User MIMO Communications", 23rd Telecommunications forum TELFOR 2015 (Year: 2015).*
(Continued)

Primary Examiner — Dieu Hien T Duong
Assistant Examiner — Bamidele A Jegede
(74) Attorney, Agent, or Firm — Gregory L. Mayback; Dickinson Wright PLLC

(57) ABSTRACT

An antenna alignment device includes a handheld enclosure comprising a high-precision GPS receiver, high-precision GPS antennas spaced apart along an enclosure heading, a display, a camera having a central axis aligned with the heading, and a user interface. A circuit board connects these components and has a processor programmed to determine an azimuth of the heading with the receiver and antennas based upon received GPS signals, to show a view of the camera on the display, to depict crosshairs at a display centerpoint superimposed on the view, to receive a target coordinate from a user through the user interface, to calculate a distance between the target coordinate and the heading and, if the distance is short enough to be contained within the view, to superimpose a bullseye upon the display at the target coordinate, and to dynamically move the bullseye on the display as the user moves the enclosure.

19 Claims, 22 Drawing Sheets

FIG. 32

Related U.S. Application Data is a continuation-in-part of application No. 14/213,076, filed on Mar. 14, 2014, now abandoned, application No. 15/422,033, which is a continuation-in-part of application No. 14/213,076, filed on Mar. 14, 2014, now abandoned.

(60) Provisional application No. 61/798,130, filed on Mar. 15, 2013.

(51) Int. Cl.
    *H01Q 1/42*  (2006.01)
    *H01Q 1/12*  (2006.01)
    *H01Q 1/24*  (2006.01)

(56) References Cited

U.S. PATENT DOCUMENTS

| | | | |
|---|---|---|---|
| 5,126,751 A | 6/1992 | Wada et al. | |
| D358,820 S | 5/1995 | Gunnarsson | |
| D366,877 S | 2/1996 | Gipson | |
| D396,041 S | 6/1998 | Read | |
| 5,760,751 A | 6/1998 | Gipson | |
| 5,929,816 A | 7/1999 | Gross et al. | |
| 5,933,123 A | 8/1999 | Kaul | |
| 6,897,828 B2 | 5/2005 | Boucher | |
| 7,073,268 B1* | 7/2006 | Etter | B23D 59/002 33/286 |
| 7,180,451 B2 | 2/2007 | Silzer, Jr. | |
| 7,755,360 B1* | 7/2010 | Martin | G01R 19/00 324/326 |
| 7,786,937 B1 | 8/2010 | Stierhoff et al. | |
| 8,018,374 B2 | 9/2011 | Imai et al. | |
| 8,077,113 B2 | 12/2011 | Syed et al. | |
| 8,188,714 B2 | 5/2012 | Petrick et al. | |
| 8,446,335 B2 | 5/2013 | Frank | |
| 8,610,629 B2 | 12/2013 | Pascolini et al. | |
| 8,665,160 B2 | 3/2014 | Uttermann et al. | |
| 9,557,404 B1* | 1/2017 | Wild | G01S 5/14 |
| 2002/0028654 A1 | 3/2002 | Gleyzes et al. | |
| 2005/0035923 A1 | 2/2005 | Syed et al. | |
| 2005/0150121 A1* | 7/2005 | Jaklitsch | F41G 3/326 33/286 |
| 2008/0120655 A1* | 5/2008 | Guzman | H04N 7/20 725/70 |
| 2009/0021447 A1* | 1/2009 | Austin | G01B 21/24 343/880 |
| 2009/0167593 A1* | 7/2009 | Storz | G01S 7/24 342/133 |
| 2009/0201203 A1* | 8/2009 | Le Sage | G01S 19/53 342/357.27 |
| 2010/0008028 A1 | 1/2010 | Richardson et al. | |
| 2010/0076616 A1* | 3/2010 | Kagan | G01R 19/2513 700/295 |
| 2010/0088032 A1* | 4/2010 | Nielsen | G06Q 10/06 702/5 |
| 2010/0189887 A1* | 7/2010 | Nielsen | G06Q 10/06 427/136 |
| 2010/0205032 A1* | 8/2010 | Nielsen | G06Q 10/06 705/7.11 |
| 2011/0000095 A1* | 1/2011 | Carlson | G01C 15/00 33/275 R |
| 2011/0036747 A1 | 2/2011 | Petrick et al. | |
| 2011/0075886 A1* | 3/2011 | Ashjaee | G01C 21/005 382/106 |
| 2011/0090118 A1* | 4/2011 | Raeder | H01Q 3/005 342/359 |
| 2011/0191058 A1* | 8/2011 | Nielsen | B65D 83/203 702/130 |
| 2011/0225804 A1 | 9/2011 | Clifford et al. | |
| 2011/0228192 A1 | 9/2011 | Hollaway | |
| 2011/0285584 A1* | 11/2011 | Le Sage | G01S 19/14 342/357.25 |
| 2012/0068899 A1* | 3/2012 | Ayotte | H01Q 1/08 343/766 |
| 2012/0105300 A1 | 5/2012 | Ando et al. | |
| 2012/0166137 A1* | 6/2012 | Grasser | G01C 15/00 702/150 |
| 2012/0194393 A1* | 8/2012 | Uttermann | H01Q 1/243 343/702 |
| 2012/0319895 A1 | 12/2012 | Bruchiel | |
| 2013/0012261 A1 | 1/2013 | Zhu | |
| 2013/0045759 A1* | 2/2013 | Smith | H04W 4/029 455/456.6 |
| 2014/0016331 A1 | 1/2014 | Ting | |
| 2014/0051945 A1 | 2/2014 | Sarasua et al. | |
| 2015/0130672 A1 | 5/2015 | Cordone | |
| 2016/0020504 A1 | 1/2016 | Michaelis et al. | |

OTHER PUBLICATIONS

European Search Report of European Patent App. No. 17170109.7 dated Jan. 4, 2018.

International Search Report,and Written Opinion for International Application No. PCT/US2014/055297 dated Dec. 16, 2014.

Multiwavesensors,—Innovative Sensor Products; Apr. 5, 2016;http://www.multiwavesensors.com.

spaa05.com, SPAA05-EHC Specification; Dec. 10, 2010; http://www.spaa05.com/products/tools/ehc/index.php.

Sunsight Instruments,—Antenna Alignment Solutions/Microwave/GPS/Azimuth Tools; Apr. 6, 2016; https://www.sunsight.com.

http://3ztelecom.com/shop/3z-rf-aligner-antenna-alignment-tool/—Retrieved Jul. 17, 2017.

https://www.youtube.com/watch?v=T-JEMNx61nA—Published Oct. 14, 2013.

* cited by examiner

Rear View showing display
Screen View

Side View

Top View

Carrying View

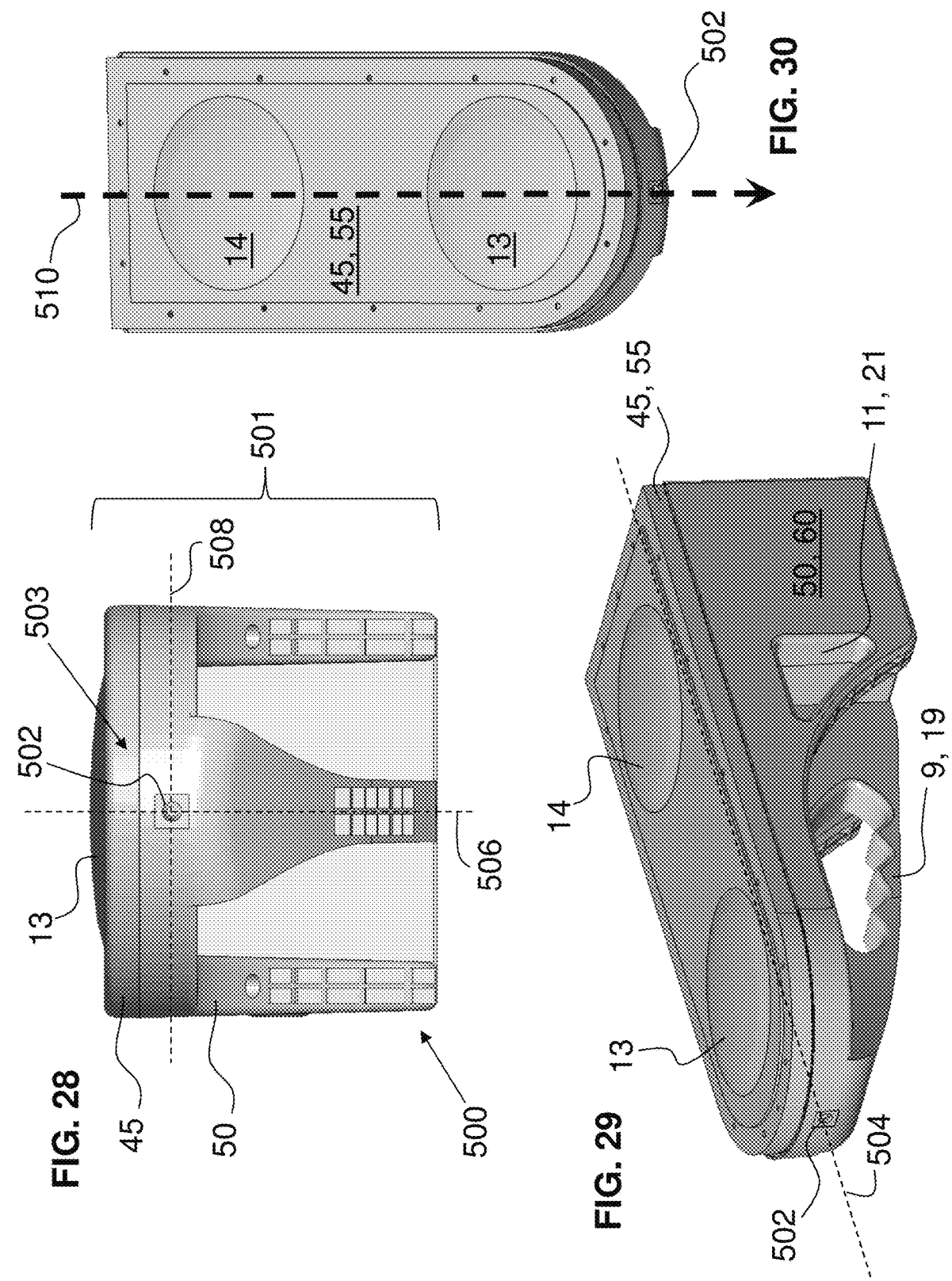

ANTENNA ALIGNMENT DEVICE AND METHODS FOR ALIGNING ANTENNAS

CROSS-REFERENCE TO RELATED APPLICATIONS

This application is:
a continuation-in-part of U.S. patent application Ser. No. 14/483,790 filed on Sep. 11, 2014, which application is:
   a continuation-in-part of U.S. patent application Ser. No. 14/213,076 filed on Mar. 14, 2014 (which application claims priority to U.S. Provisional Application Ser. No. 61/798,130, filed on Mar. 15, 2013); and
a continuation-in-part of U.S. patent application Ser. No. 14/213,076 filed on Mar. 14, 2014 (which application claims priority to U.S. Provisional Application Ser. No. 61/798,130, filed on Mar. 15, 2013),
the entire disclosures of these applications are hereby incorporated herein by reference in its entirety.

STATEMENT REGARDING FEDERALLY SPONSORED RESEARCH OR DEVELOPMENT

Not Applicable

FIELD OF THE INVENTION

The present invention lies in the field of telecommunications. The present disclosure relates to alignment of communication antennas.

BACKGROUND OF THE INVENTION

An essential part of a wireless service provider's business is its ability to provide adequate communication capabilities to its customers. In order to provide said capabilities, wireless service providers deploy communication antennas on towers, rooftops, buildings, and other tall structures. The height of such structures allows the radio signal from each communication antenna to travel several miles, establishing a geographic area within which service may be provided to customers. Wireless service providers typically install several directional communication antennas per site as multiple directional communication antennas are needed for increased capacity and reception.

In order to provide the required radio signal throughout a defined area, each directional antenna is intended to face a specific direction (referred to as "azimuth") relative to true north, to be inclined at a specific downward angle with respect to the horizontal in the plane of the azimuth (referred to as "downtilt") and to be vertically aligned with respect to the horizontal (referred to as "skew"). Undesired changes in azimuth, downtilt, and skew will detrimentally affect the coverage of a directional antenna. These alignments may be likened to the axes commonly used to describe the attitude of an aircraft: Azimuth corresponds to the yaw of an aircraft about a vertical axis; skew corresponds to the roll of an aircraft about its longitudinal axis; and downtilt corresponds to the pitch of the nose of an aircraft above or below a horizontal plane (or about a lateral axis extending horizontally through the aircraft at right angles to the longitudinal axis). In general, the more accurate the installation, the better the network performance that may be achieved within the area served by the antenna. Directional antenna installations are performed by tower companies who use certified tower climbers to carry out these installations.

Due to inaccurate and user subjective antenna installation techniques used by many tower companies, a need has grown for the use of GPS Antenna Alignment Devices. These devices for many years have been very large in size and challenging to attach to the host Antenna.

Thus, a need exists to overcome the problems with the prior art systems, designs, and processes as discussed above.

SUMMARY OF THE INVENTION

The invention provides an antenna alignment device and methods for aligning antennas that overcome the hereinafore-mentioned disadvantages of the heretofore-known devices and methods of this general type and that provide such features with an alignment device that is smaller, lighter in weight, and, in particular, is easier to use by providing a camera and a visual alignment screen having a customized display augmented by the camera. The alignment device is designed with the tower climber in mind and is also capable of calculating target azimuth and tilt parameters when installing point-to-point Microwave Dishes in addition to providing antenna alignments. Along with the alignment device a universal antenna clamp is provided for temporal attachment to an antenna during alignment.

To align objects, such as antennas, an antenna installer attached an antenna alignment tool to the antenna and uses outputs of the tool to achieve accurate alignment results. The data is delivered to the user (e.g., a worker aligning the antenna) through a graphical user interface (GUI), for example, a built-in LCD screen or a wireless connection to a smart phone, tablet or laptop. Alignment data is presented through the GUI in the form of numerical data and the user uses this numerical data to properly align the host antenna and, in the case of point-to-point microwave dishes, both antennas to each other. Once properly aligned, the antenna alignment tool or auxiliary devices save the data for reporting purposes. By adding a camera mechanically aligned with the antenna alignment tool, the camera images can be output to the GUI and visually show the user exactly where the antenna alignment tool is pointing, for example, with crosshairs. In an exemplary embodiment, the position of the crosshairs always remains in a set position on the GUI to indicate to the user the exact location to which the antenna alignment tool is pointing. In particular, the crosshairs always remain in the center of a display screen. From target data, an alignment indicated is overlaid on the camera image, for example, as a bullseye, which instructs the user where to aim the antenna, thereby achieving a precise alignment. As the user moves the antenna alignment tool, the bullseye will move either closer or further away from the crosshairs. It is the goal of the user to move the crosshairs over the bullseye. Once this condition is met, the Antenna Alignment tool will be aligned to the target/goal alignment. Unlike exiting antenna alignment tools that only provide a user with numerical data to guide antenna alignment, the camera-assisted antenna alignment tool helps the user achieve precise antenna alignment faster and easier. Once the camera-assisted antenna alignment tool is aiming precisely, crosshairs match bullseye, and the data is stored and used for reporting purposes. As used herein, "crosshairs" and "bullseye" are not limited to particular shapes such as concentric circles or a dot centered within one or more circles. Bullseye and crosshairs are interchangeable herein and include each of these exemplary embodiments but also include other geometric shapes, configurations, and styles. The bullseye can the crosshairs can be separate shapes or they can be the same shape. Examples of the bullseye and the crosshairs include an "X", a "+", a "«»", a "»«", a "⌑", and any number of shapes like the exemplary shapes depicted in FIG. 35.

Traditional antenna alignment tools generate reports so the wireless network operators have proof of proper antenna alignment, but there is no way to record or show a line-of-sight image of that aligned antenna. With the camera-assisted antenna alignment tool, a perfectly aligned image showing antenna line-of-sight is available and provides very valuable information for wireless network operators. The camera-assisted antenna alignment tool makes it possible to know, for example, if a new building or structure was constructed in front of the antenna, thus blocking the Radio Frequency (RF) signal, or if surrounding foliage has grown in front of the antenna causing poor RF Performance. Visual proof of an antenna's line-of-sight to verify proper highway coverage, special events, stadiums, airports, high-rise, and many other coverage objectives is now possible with the antenna alignment tool to maximize network performance.

With the foregoing and other objects in view, there is provided, in accordance with the invention, an antenna alignment device. In one embodiment, the antenna alignment device includes an enclosure. The enclosure has a top portion having a single radome and a bottom portion. The single radome has a one or more domes. The top portion and the bottom portion are attached to form a single mold. The single mold houses a global positioning system receiver and a plurality of antennas. Each of the plurality of antennas is covered by the single radome and a respective dome of the one or more domes. The single mold also houses an interconnect circuit board and a touch screen display.

In accordance with another feature of the invention, there is provided a shielded chamber within the enclosure that secures the touch screen display.

In accordance with a further feature of the invention, the shielding of the shielded chamber includes copper paint.

In accordance with an added feature of the invention, there is provided internal shielded wiring for an ON/OFF switch of the enclosure.

In accordance with an additional feature of the invention, there is provided a built-in carrying handle for the enclosure.

In accordance with yet another feature of the invention, the built-in carrying handle is part of the bottom portion of the enclosure.

In accordance with yet a further feature of the invention, there is provided an attachment mechanism to keep the antenna alignment device from falling.

In accordance with yet an added feature of the invention, the attachment mechanism includes at least one opening within the enclosure that allows the antenna alignment device to be tied down.

In accordance with yet an additional feature of the invention, the at least one opening is part of the bottom portion of the enclosure.

In accordance with again another feature of the invention, the enclosure includes a memory slot, a universal serial bus (USB) port, and a battery charging port.

In accordance with again a further feature of the invention, the enclosure includes a cover that protects, the memory slot, the USB port, and the battery charging port.

In accordance with again an added feature of the invention, the enclosure includes a mounting knob.

In accordance with again an additional feature of the invention, the mounting knob includes a single Pem-nut.

In accordance with another feature of the invention, the single mold houses a short range wireless transceiver.

In accordance with a further feature of the invention, a bumper is attached to the enclosure.

In accordance with still another feature of the invention, a waterproof screen is attached to the touch screen display.

In accordance with still a further feature of the invention, the plurality of domes minimizes radio frequency (RF) reflection and improves RF reception.

In accordance with another feature of the invention, the improvement in RF reception decreases a calculation time for measurements of the antenna alignment device.

With the objects in view, there is also provided an antenna alignment device comprising a handheld enclosure comprising a top portion comprising a single radome having a plurality of domes and a bottom portion. The top portion and the bottom portion attached to form a single structure having therein at least one high-precision global positioning system (GPS) receiver, a plurality of high-precision GPS antennas covered by the single radome and a respective dome of the plurality of domes, connected to the at least one high-precision GPS receiver, and spaced apart from one another along a line that defines an enclosure heading, a display exposed to the environment on a surface of one of the top portion and the bottom portion and having a centerpoint, a camera having a central axis aligned with the enclosure heading and, when operating, electronically outputting a view, a user interface; and an interconnect circuit board communicatively connected to the at least one high-precision GPS receiver, the plurality of high-precision GPS antennas, the display, the camera, and the user interface. The circuit board has a processor programmed to determine an azimuth of the enclosure heading accurate at least to within approximately ¾ of a degree with the at least one high-precision GPS receiver and the plurality of high-precision GPS antennas based upon received GPS signals, to show the view of the camera on the display, to depict a crosshairs at the centerpoint of the display superimposed on the view being shown on the display, to receive a target coordinate from a user through the user interface, to calculate a distance between the target coordinate and the enclosure heading and, if the distance is short enough to be contained within the view, to superimpose a bullseye upon the display at the target coordinate, and to dynamically move the bullseye on the display as the user moves the enclosure.

With the objects in view, there is also provided an antenna alignment device comprising a handheld enclosure comprising at least one high-precision global positioning system (GPS) receiver, a plurality of high-precision GPS antennas connected to the at least one high-precision GPS receiver and spaced apart from one another along a line that defines an enclosure heading, a display having a centerpoint, a camera having a central axis aligned with the enclosure heading and, when operating, electronically outputting a view, a user interface, and an interconnect circuit board communicatively connected to the at least one high-precision GPS receiver, the plurality of high-precision GPS antennas, the display, the camera, and the user interface. The circuit board has a processor programmed to determine an azimuth of the enclosure heading with the at least one high-precision GPS receiver and the plurality of high-precision GPS antennas based upon received GPS signals, to show the view of the camera on the display, to depict a crosshairs at the centerpoint of the display superimposed on the view being shown on the display, to receive a target coordinate from a user through the user interface, to calculate a distance between the target coordinate and the enclosure heading and, if the distance is short enough to be contained within the view, to superimpose a bullseye upon the display at the target coordinate, and to dynamically move the bullseye on the display as the user moves the enclosure.

With the objects in view, there is also provided an antenna alignment device comprising a handheld enclosure comprising at least one high-precision global positioning system (GPS) receiver, a plurality of high-precision GPS antennas connected to the at least one high-precision GPS receiver, spaced apart from one another along a line that defines an enclosure heading, a display having a centerpoint, a camera having a central axis aligned with the enclosure heading and, when operating, electronically outputting a view, a user interface, and an interconnect circuit board communicatively connected to the at least one high-precision GPS receiver, the plurality of high-precision GPS antennas, the display, the camera, and the user interface. The enclosure, the at least one high-precision GPS receiver, the plurality of high-precision GPS antennas, the display, the camera, the user interface, and the interconnect circuit board weigh between approximately 0.5 and 20 pounds.

In accordance with another feature, the display is a touchscreen and the user interface comprises an on/off device at the enclosure and software-generated objects on the touchscreen and at least some user input is carried out through the touchscreen of the display.

In accordance with a further feature, there is provided a second display on a computing device separate from the enclosure and communicatively connected to the processor, and the computing device being selected from a smartphone, a tablet, a laptop, a desktop computer, and an Internet connection.

In accordance with an added feature, the user interface comprises an on/off device at the enclosure and software-generated objects on the display and at least some user input is carried out through selecting the objects the display.

In accordance with an additional feature, the second display is a touchscreen and the user interface comprises an on/off device at the enclosure and the software-generated objects on the second display and at least some user input is carried out through selecting the objects the second display.

In accordance with yet another feature, the processor is programmed to generate an electronic copy of the view when selected by the user.

In accordance with yet a further feature, the processor is programmed to generate a report based the electronic copy of the view to certify that no intermediate building or foliage blocks line-of-sight.

In accordance with yet an added feature, there is provided a shielded chamber within the enclosure in which is secured the display.

In accordance with yet an additional feature, there is provided an attachment mechanism shaped to fix the enclosure to a structure and keep the antenna alignment device from falling.

In accordance with again another feature, the enclosure further comprises a memory slot, a universal serial bus (USB) port connected to the interconnect circuit board, a battery connected to the interconnect circuit board, and a battery charging port connected to the interconnect circuit board.

In accordance with again a further feature, the plurality of domes have a shape that improves RF reception between approximately 10% and approximately 20% and the improvement in RF reception decreases a calculation time for measurements by the processor.

In accordance with again an added feature, the display is attached to the enclosure and is exposed to the environment on a surface of the enclosure.

In accordance with again an additional feature, the display is on a computing device separate from the enclosure and communicatively connected to the processor, and the computing device is selected from a smartphone, a tablet, a laptop, a desktop computer, and an Internet connection.

In accordance with still another feature, the user interface comprises an on/off device at the enclosure and software-generated objects on the display and at least some user input is carried out through selecting the objects the display.

In accordance with still a further feature, the display is a touchscreen and the user interface comprises an on/off device at the enclosure and the software-generated objects on the display and at least some user input is carried out through selecting the objects the display.

In accordance with still an added feature, the processor is programmed to determine an azimuth of the enclosure heading accurate at least to within approximately $\frac{3}{4}$ of a degree with the at least one high-precision GPS receiver and the plurality of high-precision GPS antennas based upon the received GPS signals.

In accordance with a concomitant feature, the processor is programmed to generate an electronic copy of the view when selected by the user and generate a report based the electronic copy of the view to certify that no intermediate building or foliage blocks line-of-sight.

Although the systems, apparatuses, and methods are illustrated and described herein as embodied in an antenna alignment device and methods for aligning antennas, they are, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which:

FIG. 28 is a front elevational view of another exemplary embodiment of an alignment device;

FIG. 29 is a perspective view from the front left side of the alignment device of FIG. 28;

FIG. 30 is a perspective view from above the front of the alignment device of FIG. 28;

DETAILED DESCRIPTION OF THE INVENTION

Figure 1:
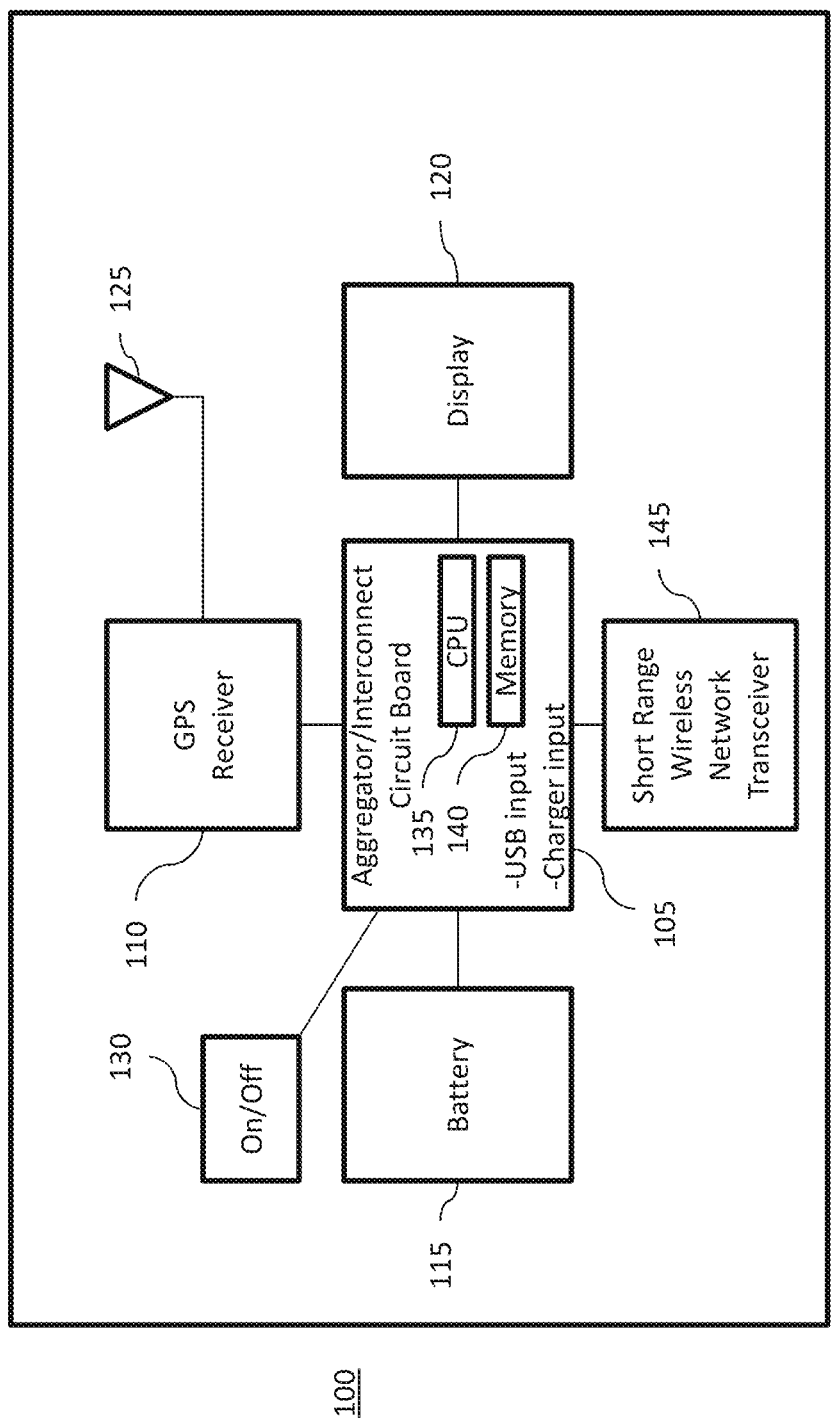
FIG. 1 is a block circuit diagram of an exemplary embodiment of an alignment device.
Figure 2:
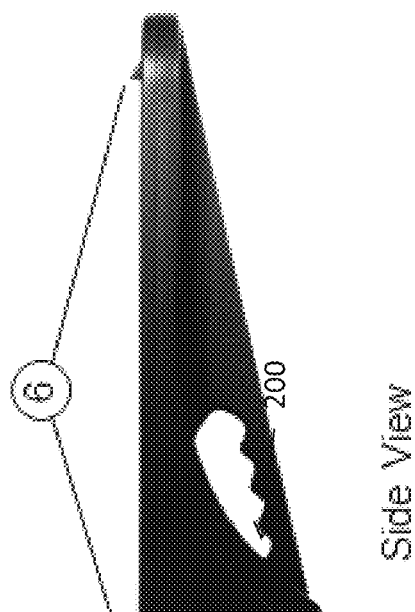
FIG. 2 is a rear elevational view of an enclosure for the alignment device of FIG. 1 according to one exemplary embodiment.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

It will be appreciated that embodiments of the systems, apparatuses, and methods described herein may be comprised of one or more conventional processors and unique stored program instructions that control the one or more processors to implement, in conjunction with certain non-processor circuits and other elements, some, most, or all of the functions of the devices and methods described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system or programmable device. A "program," "software," "application," "computer program," or "software application" may include a subroutine, a function, a procedure, an object method, an object implementation, an executable application, an applet, a servlet, a source code, an object code, any computer language logic, a shared library/dynamic load library and/or other sequence of instructions designed for execution on a computer system.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIG. 1, there is shown a first exemplary embodiment of an antenna alignment device. The radio-frequency (RF) aligner, e.g., device 100, uses a global positioning system (GPS) receiver in order perform an antenna alignment. Device 100 houses components that include a battery 115, a GPS Receiver 110, GPS Antennas 125, a touch sensitive flat panel display 120, an on/off switch 130, a short range wireless network transceiver 145, and an interconnect circuit board 105.

The short range wireless network transceiver can be Bluetooth, WiFi, or any other appropriate short range wireless standard. In one exemplary embodiment, transceiver 145 is used to wirelessly import/export data, e.g., to retrieve saved measurement reports, for example, using a mobile device of a user.

Interconnect circuit board 105 includes one or more processors 135 (e.g., central processing unit (CPU) and one or more memory elements 140 (e.g., random access memory (RAM) and/or read only memory (ROM).

It should be understood that software modules running in the interconnect/aggregator circuit board 105 can be implemented as one or more physical devices that are coupled to the CPU 135 through a communication channel. Software running on device 100 can be represented by one or more software applications (or even a combination of software and hardware, e.g., using application specific integrated circuits (ASIC)), where the software is loaded from a storage medium, (e.g., a magnetic or optical drive or diskette, or a solid state drive (SSD)) and operated by the CPU 135 in the memory 140 of the interconnect circuit board 105. Examples of a solid-state drive can be flash memory, a SSD hard drive, and a secure digital (SD) memory card. As such, software modules (including associated data structures) described herein can be stored on a computer readable medium, e.g., RAM memory, SSD, magnetic or optical drive or diskette and the like.

Device 100 houses all the components mentioned above within a small and light-weight enclosure 200 as shown in FIGS. 2 through 5. Device 100 can also house the components mentioned above within a small lightweight enclosure 300 as shown in FIGS. 6 through 13. Device 100 can also house the components mentioned above within a small lightweight enclosure 400 as shown in FIGS. 17 through 24. Device 100 can also house the components mentioned above within a small lightweight enclosure 500 as shown in FIGS. 28 through 30. Features of enclosure 200 also apply to enclosure 300 and vice versa. Likewise, features of enclosures 200 and 300 apply to enclosure 400 and vice versa. Likewise, features of enclosures 200, 300, and 400 apply to enclosure 500 and vice versa.

Figure 12:
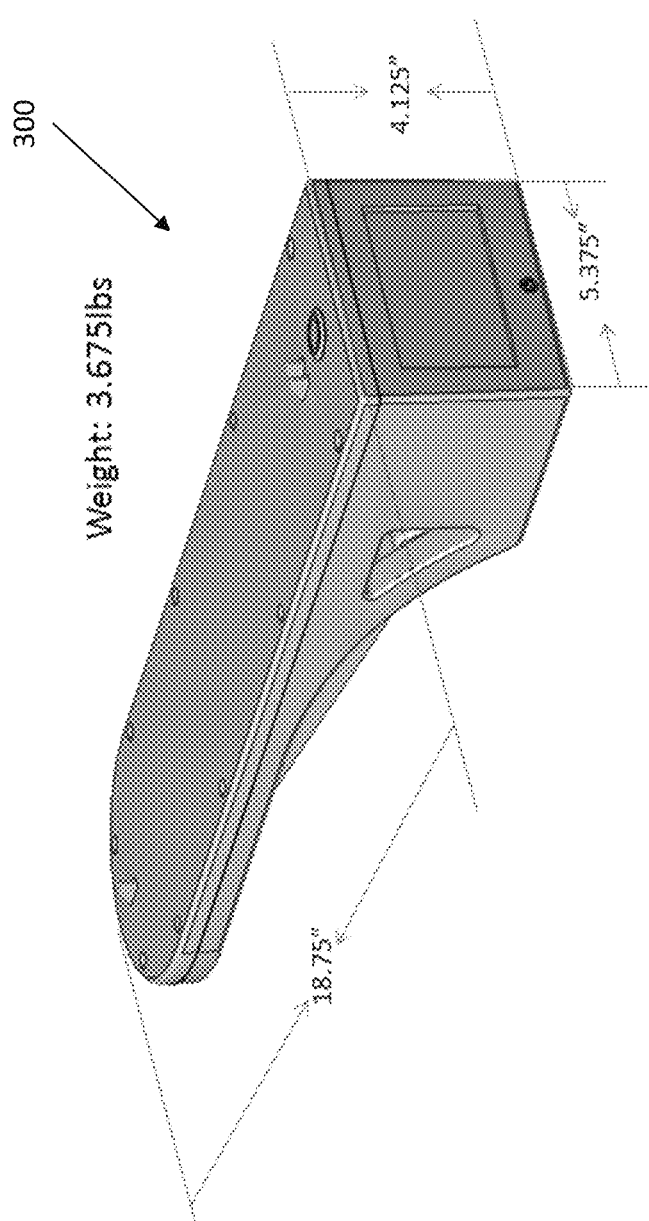
FIG. 12 is a perspective view of the enclosure of FIG. 6.
Figure 13:
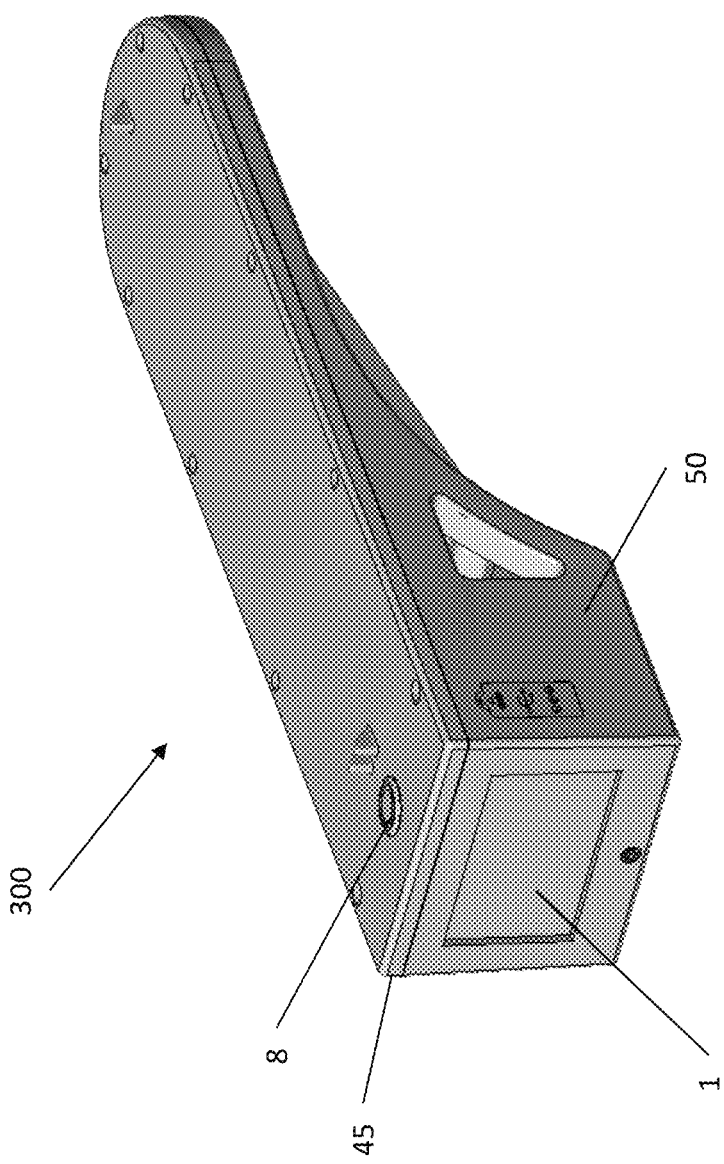
FIG. 13 is a perspective view of the enclosure of FIG. 6.

In one exemplary embodiment shown in FIG. 12, the device has a length of 18.75 inches, a width of 5.375 inches. In this embodiment, the rear portion of the enclosure 300 has a height of 4.125 inches and the weight of device 100, 300 is approximately 3.675 pounds. Other possible dimensions for a handheld configuration include a length of between approximately 6 inches and approximately 36 inches, a width of between approximately 1 inch and approximately 12 inches, and a height of between approximately 1 inch to approximately 12 inches. The weight should be easily carried by one person and, therefore, is between approximately ½ pound and approximately 20 pounds, preferably between approximately 1 pound and 5 pounds.

Device 100 has a built-in touch sensitive flat panel display 1, 120 that is used as a graphical user interface. Device 100 also has a very sensitive GPS compass that is accurate to within ¾ of a degree.

The touch sensitive flat panel display 1, 120 is a built-in touch screen. Although a touch screen is not shown in enclosure 400, a touch screen like touch sensitive flat panel display 1, 120 can be included in space 31. Prior art alignment device makers do not tend to use touch screens because they create a significant amount of noise for the GPS. The touch sensitive flat panel display 1, 120 is placed or secured within a chamber of the enclosure 200, 300, 400. The touch screen chamber is shielded to reduce the amount of noise affecting the GPS system/readings. In one exemplary embodiment, the touch screen chamber is painted with copper paint to shield the emissions radiated from the display 1, 120 and thereby reduce interference with the GPS. In one exemplary embodiment, wiring internal to the enclosure for On/Off switch 8, 130 is also shielded.

In one exemplary embodiment, a screen is attached to touch sensitive flat panel display 1, 120 for waterproofing. In one embodiment, the screen is attached using double sided tape, e.g., 3M VHD tape.

The enclosure 200, 300, 400 includes a top portion 45, 55 and a bottom portion 50, 60. In one exemplary embodiment for enclosures 200, 300, the top portion 45 is substantially flat. In one exemplary embodiment, the top portion 55 of enclosure 400 includes one or more domes 13, 14. The top portion 45, 55 and bottom portion 50, 60 of enclosure 200, 300, 400 are attached to form a single mold, e.g., enclosure 200, 300, 400, that includes all components needed for the alignment device 100, 200, 300, 400.

The point where the top portion 55 and bottom portion 60 of enclosure 400 meet is obscured by bumper 65. Bumper 65 is used to protect and ruggedize enclosure 400. Bumper 65 can also be used to protect and ruggedize enclosures 200, 300. In one embodiment, bumper 65 is a rubber bumper.

The enclosure 200, 300, 400 of the present alignment device has a single radome, e.g., antenna cover, for a plurality of antennas. In one embodiment, the top portion 45, e.g., the cover of enclosure 200, 300, is substantially flat and is one piece.

As stated above, in one embodiment, the top portion 55, e.g., the cover of enclosure 400 includes one or more domes 13, 14. The one or more domes 13, 14 correspond to, and are situated above, a respective one or more antennas (not shown) within the enclosure. In this embodiment, the top portion 55, e.g., the cover of enclosure 400, although including domes 13, 14, is still one piece.

Thus, the top portion 45, 55 of the enclosure 200, 300, 400 can be considered a single radome. Having a single radome, among other advantages, reduces assembly costs, uses less parts, and provides less points of failure. Prior art alignment devices tend to either have multiple housings or multiple radomes for their antennas. For the purposes of this disclosure, a radome is defined as a protective cover for one or more GPS antennas that is transparent to radio waves.

The enclosure 200, 300, 400 has a mounting knob 2, which may, in one embodiment, comprise a single Pem-nut, for mounting to an antenna clamp or directly to an antenna. The mounting knob 2 can also be used to mount the device on a standard tri-pod or monopod. When the enclosure 200, 300, 400 is used on a standard tri-pod or monopod, the alignment device can be used on the ground to provide a rough verification for the device operator.

In one exemplary embodiment, enclosure 200, 300, 400 has an attachment mechanism to keep the enclosure from falling. The attachment mechanism has one or more openings, e.g., carabiner attachment 11, 21 for attaching a lanyard or rope that is used to tie off or tie-down the device in case of an accidental drop. In one embodiment, enclosure 200, 300 has built-in sighting notches 6 that provide accurate positioning. In one exemplary embodiment, the enclosure 200, 300 has a built-in handle 9, 19 for the purpose of carrying the device.

Enclosure 200, 300 has a built-in universal serial bus (USB) communication port 4 that can be used to retrieve saved measurement reports and update firmware. Enclosure 200, 300 also has a built-in battery charging port 5 that is used to charge the battery. In one exemplary embodiment, the battery may be a lithium ion battery. The USB communication port and battery charging port are coupled to circuit board 105. Enclosure 200, 300 has a built-in on and off push button. In one exemplary embodiment, the enclosure 200, 300 has a rubber cover 3 that is used to protect the USB and charging ports from dust and moisture. Although not shown in enclosure 400, rubber cover 3, the built-in USB communication port 4, and the built-in battery charging port 5, can be included in opening 23.

Enclosure 200, 300 has sighting guides 6 that are used, for example, with a monopod to remotely verify antenna azimuth.

GPS antennas (not shown) are within enclosure 200, 300, 400 and placed near the areas denoted by elements 7 in enclosures 200, 300 or under domes 13, 14 in enclosure 400. GPS antennas are used so that the device can display azimuth, latitude, longitude, height, date, and time. On/Off Switch 8, 130 is used power the device on and off. Although not shown in enclosure 400, On/Off Switch 8, 130 can be included in opening 18. Carrying handle 9, 19 is used to carry the device 100, 200, 300, 400. The monopod attachment hole 10 is used to attach a monopod to the device.

Figure 14:
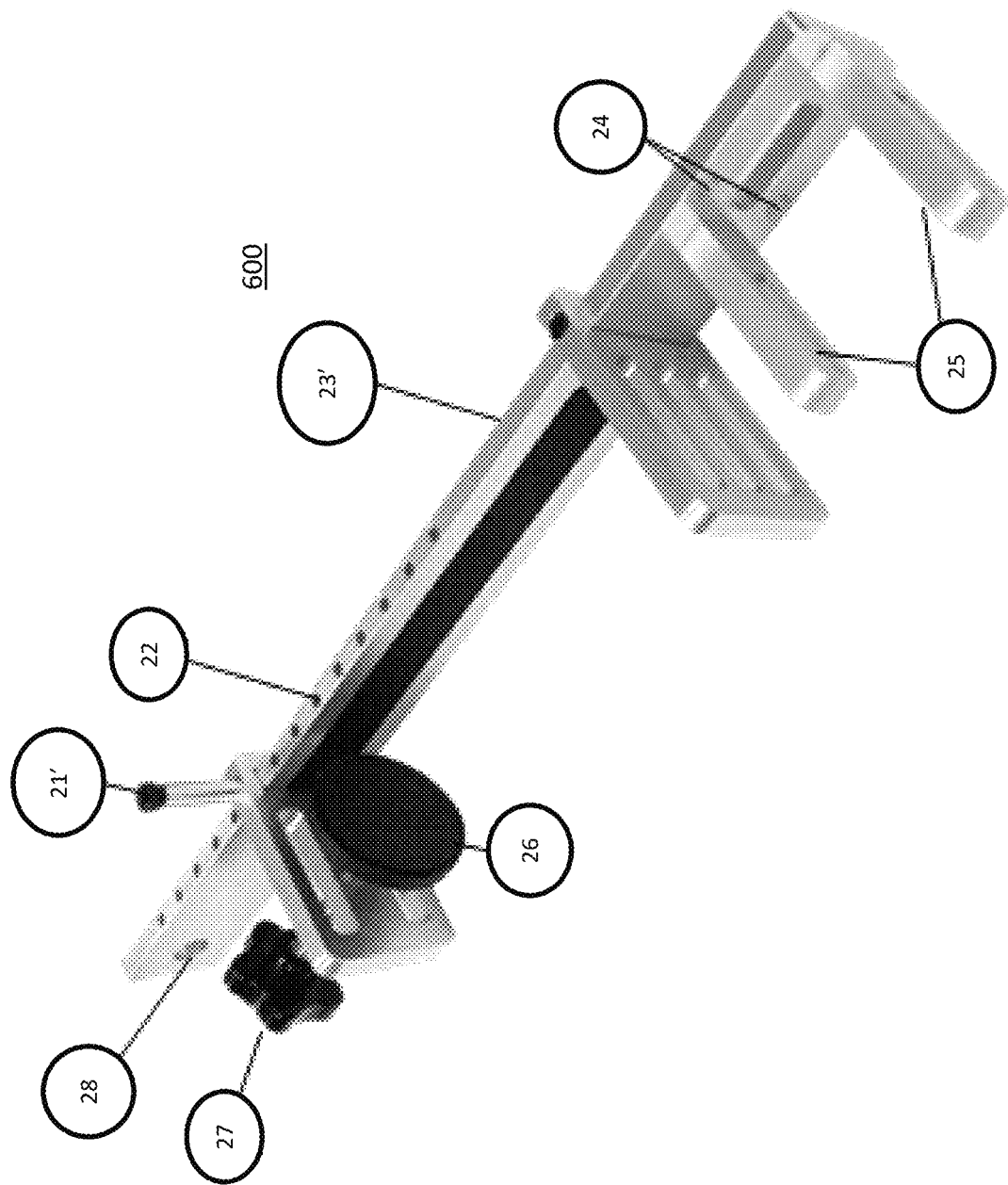
FIG. 14 is a perspective view of a clamp according to one exemplary embodiment.
Figure 15:
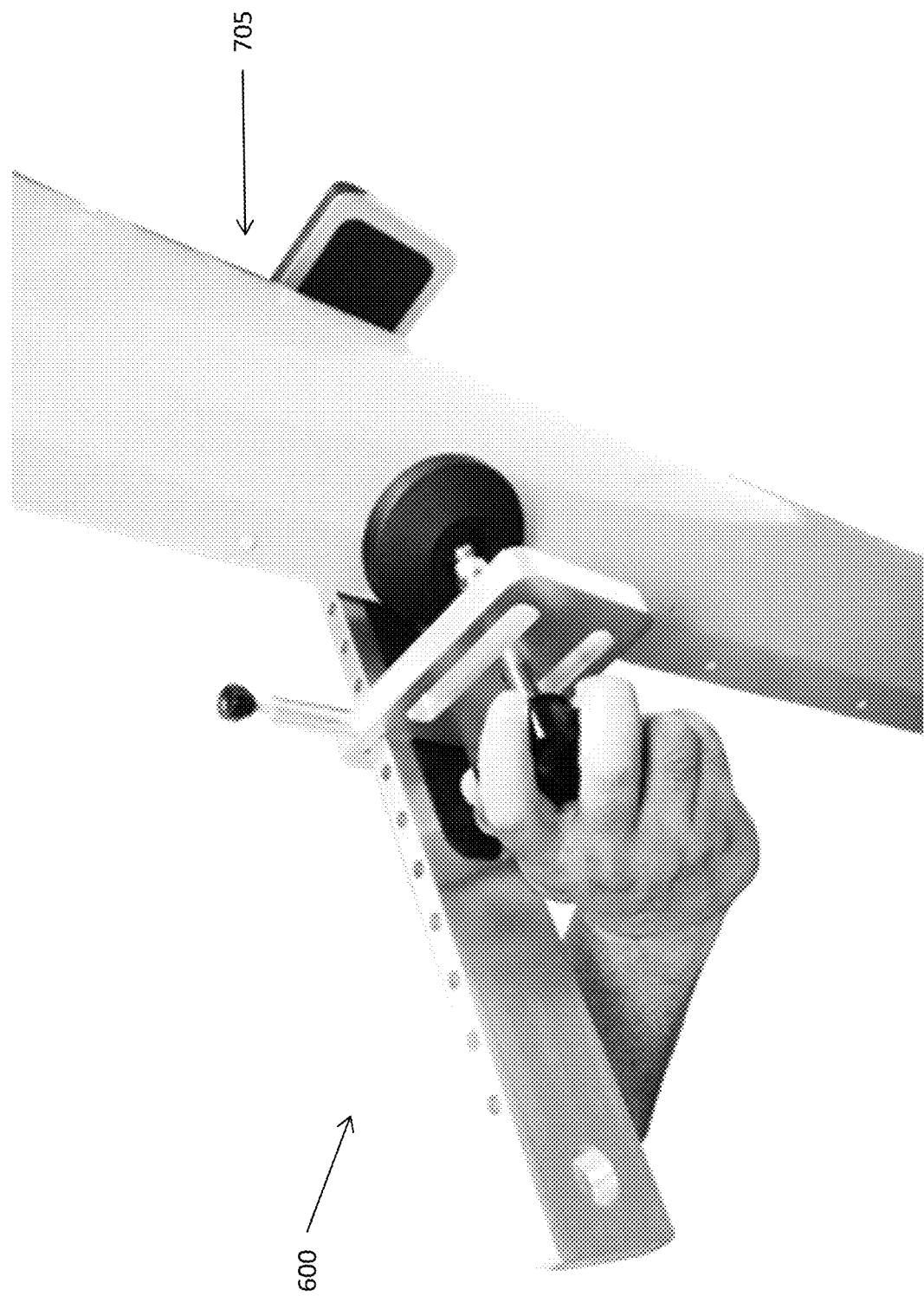
FIG. 15 is a perspective view of the clamp of FIG. 14 clamped to an antenna.
Figure 16:
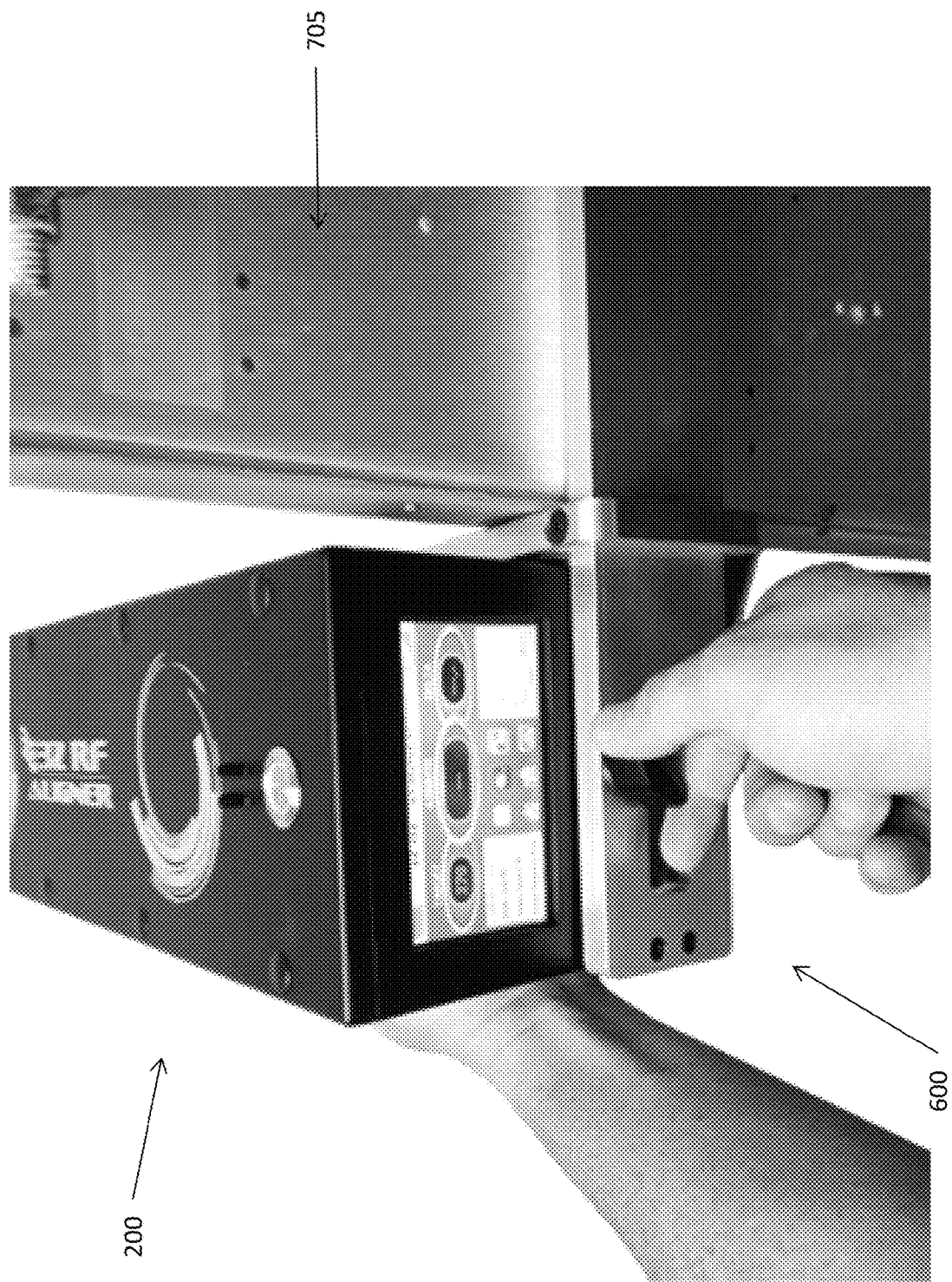
FIG. 16 is a fragmentary perspective view of the clamp of FIG. 14 clamped to an antenna and holding the housing for the alignment device of FIG. 1, FIG. 2, FIG. 3, FIG. 4, and FIG. 5
Figure 17:
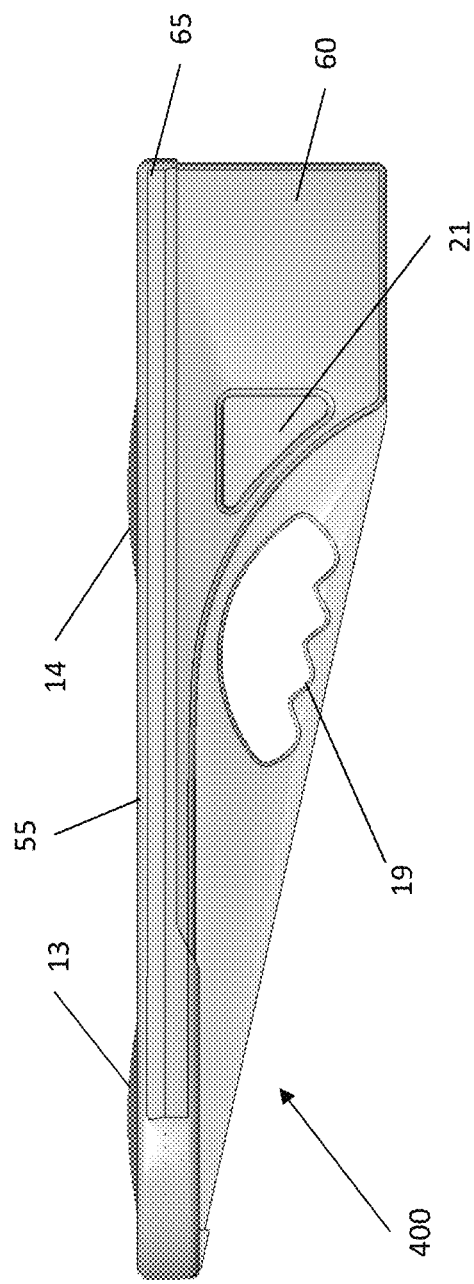
FIG. 17 is a left side elevational view of a third exemplary embodiment of the enclosure of the alignment device of FIG. 1.
Figure 18:
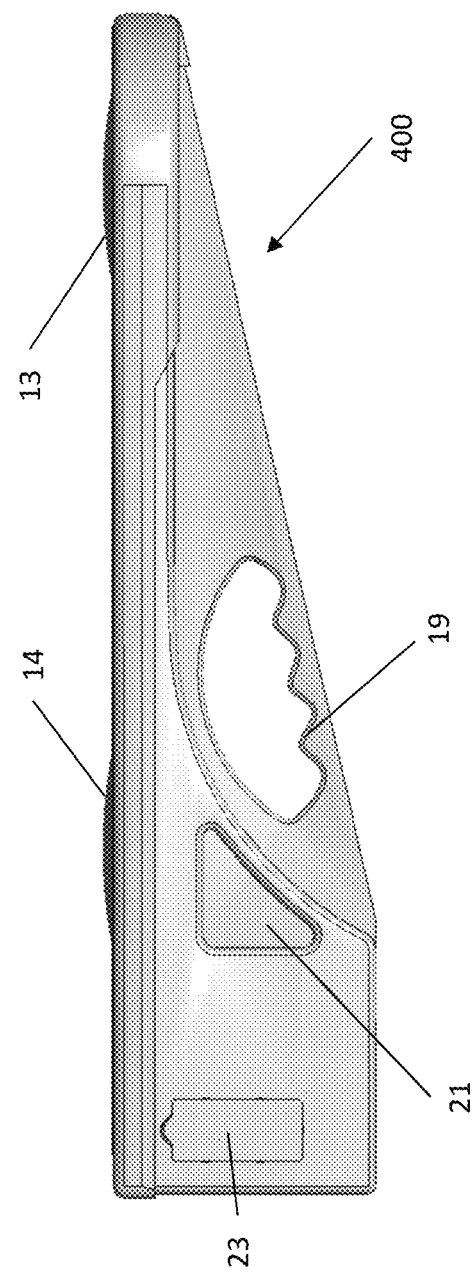
FIG. 18 is a right side elevational view of the enclosure of FIG. 17.
Figure 19:
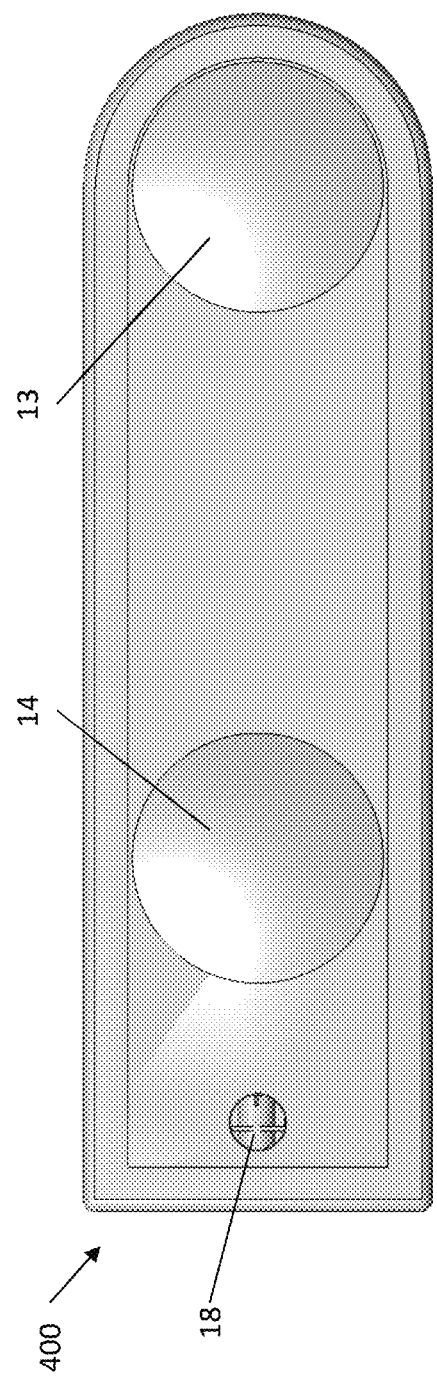
FIG. 19 is a top plan view of the enclosure of FIG. 17.
Figure 20:
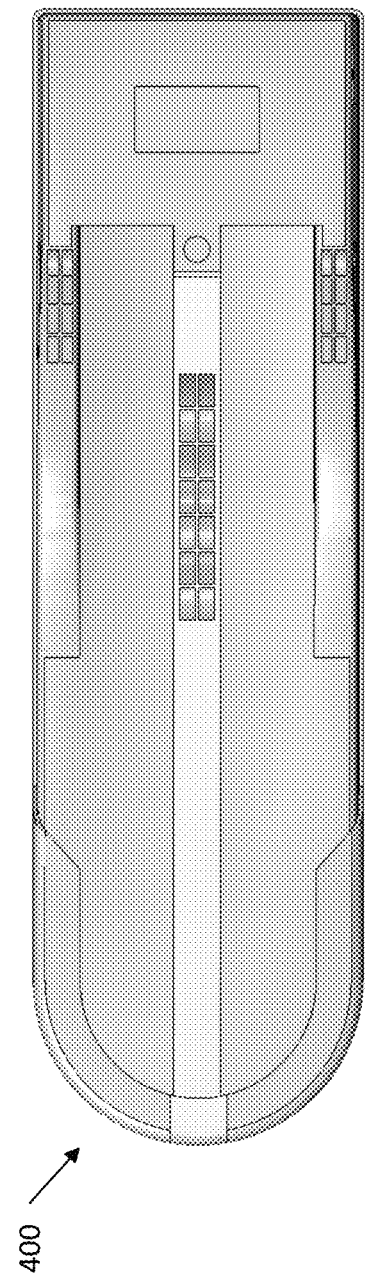
FIG. 20 is a bottom plan view of the enclosure of FIG. 17.
Figure 22:
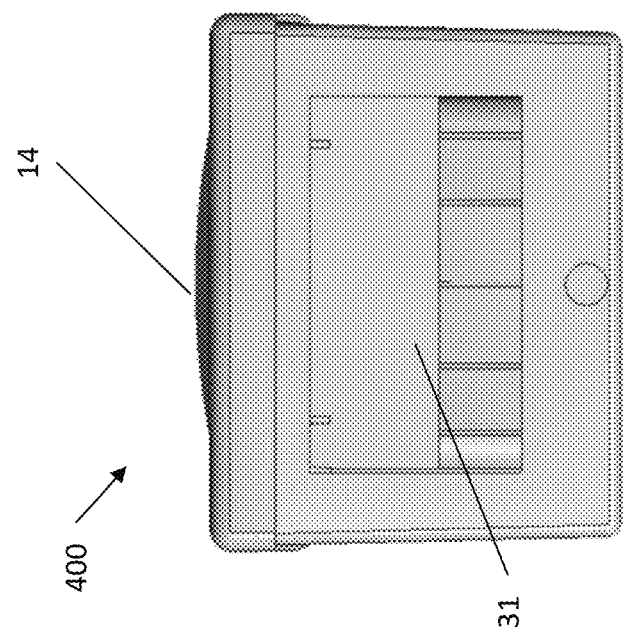
FIG. 22 is a rear elevational view of the enclosure of FIG. 17.
Figure 21:
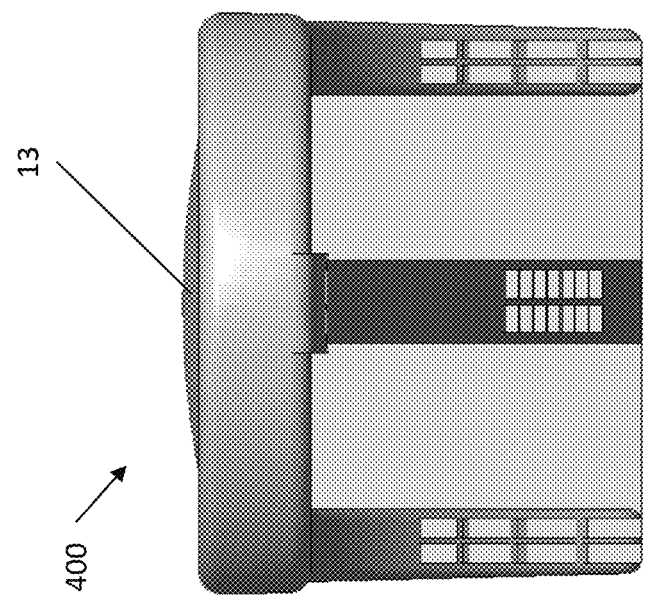
FIG. 21 is a front elevational view of the enclosure of FIG. 17.
Figure 23:
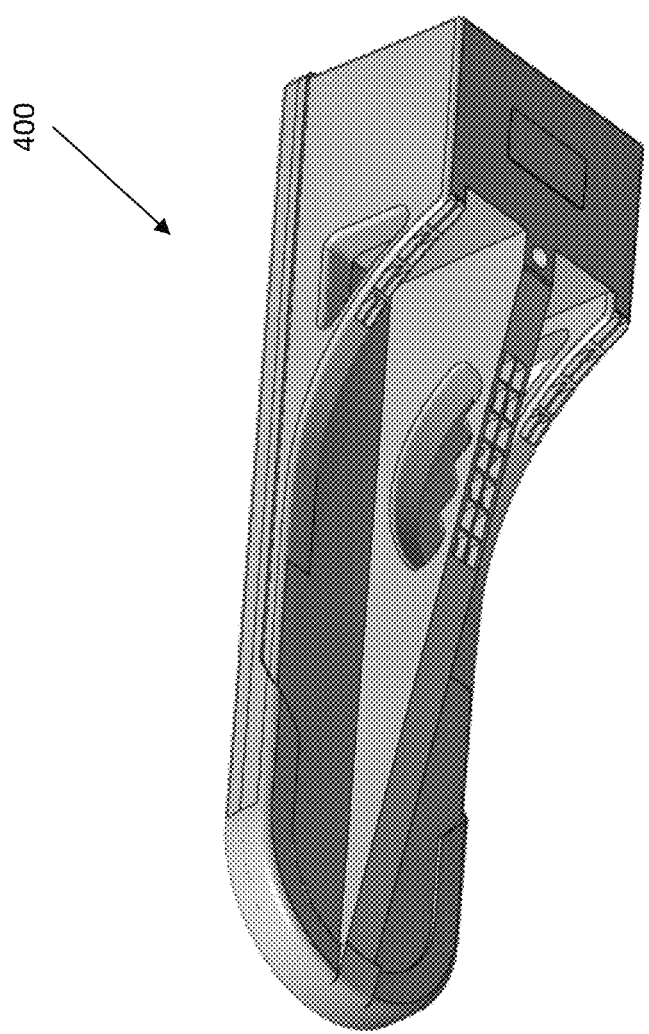
FIG. 23 is a perspective view of the enclosure of FIG. 17.
Figure 24:
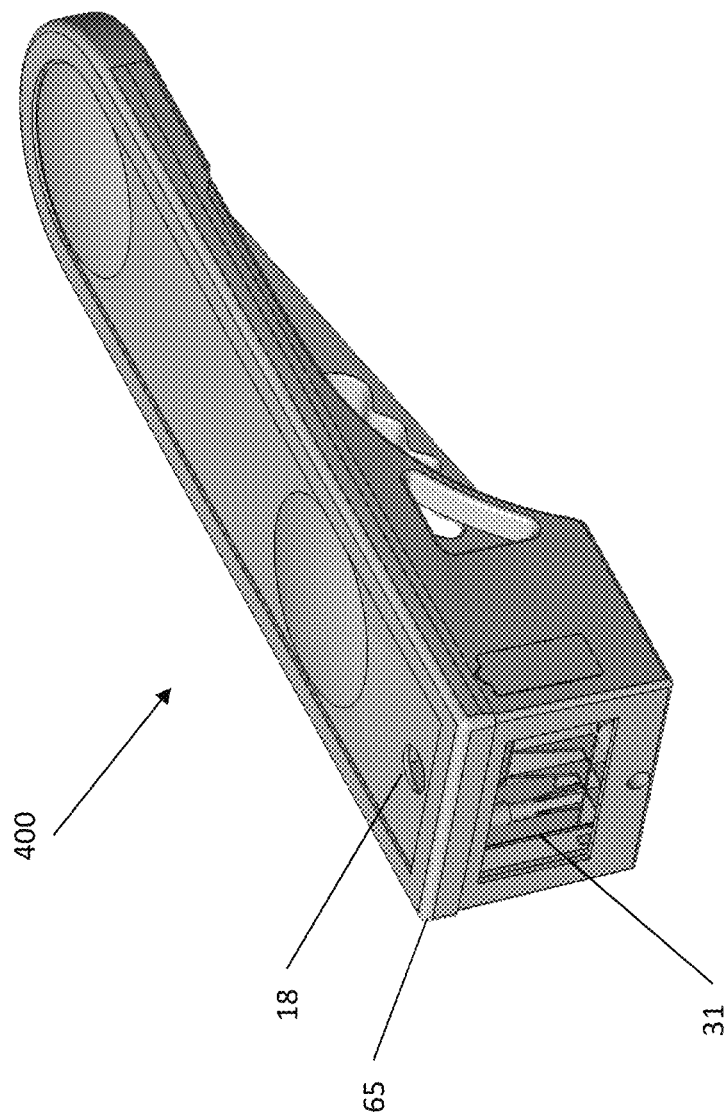
FIG. 24 is a perspective view of the enclosure of FIG. 17.

FIG. 14 is a universal antenna clamp 600. Clamp 600 attaches to a directional panel antenna shown in FIGS. 15 and 16 as antenna 705. Clamp 600 also supports the enclosure 200, 300, 400, 500 as shown in FIG. 16.

Clamp 600 attaches to the back of a directional panel antenna. Clamp 600 clamps the sides of an antenna in order to secure the clamp to an antenna. Clamp 600 supports multiple directional panel antenna widths. Clamp 600 has supporting arms that act as a support for the enclosure 200, 300, 400, 500. Clamp 600 has a mounting hole used to affix the enclosure 200, 300, 400, 500 to the universal antenna clamp 600. Clamp 600 has one opening used to attach a lanyard or rope that ties off the device in case of an accidental drop.

Clamp 600 includes an adjustment pin 21'. The adjustment pin 21' is raised in order to adjust the width of the clamp 600. Pinholes 22 are used with the adjustment pin. Back bar 23' is aligned with a back bar of the antenna 705. Unit mounting holes 24 are used to mount the device 100, 200, 300, 400, 500 with mounting knobs. Clamp mounting arms 25 are used to support the device 100, 200, 300, 400, 500. A rubber compression pad 26 is used to affix the clamp 600 to the antenna 705. A tightening knob 27 is used to tighten the clamp 600 onto the antenna 705. A carabiner attachment hole 28 is used to carry or tie-off the antenna clamp.

Figure 25:
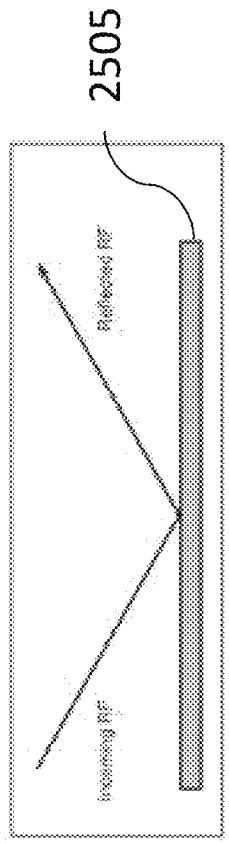
FIG. 25 is a diagram of an example reflection signal.
Figure 27:
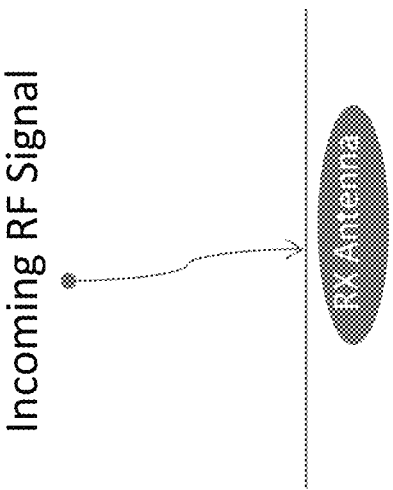
FIG. 27 is an example of incoming radio frequency signals for a flat radome.
Figure 26:
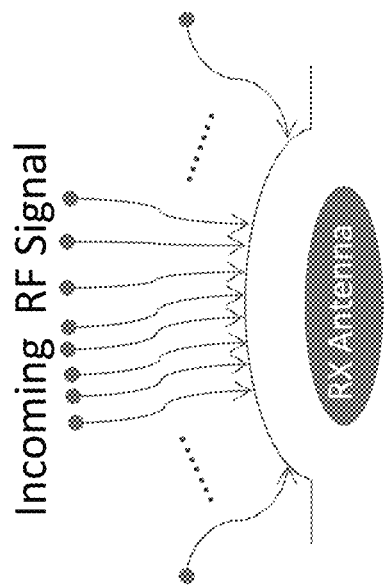
FIG. 26 is an example of incoming radio frequency signals for a domed radome.

The goal of designing domes on a radome is to minimize radio frequency (RF) reflection. The goal of device 100, 200, 300, 400, 500 is to receive GPS signals from satellites in space. Therefore, the device 100, 200, 300, 400, 500 has a shape and thickness of the dome that is optimized to minimize path loss and shaped to minimize reflections. Highest RF penetration through a surface or radome occurs when a signal arrives orthogonal to the surface. For example a line of site microwave communication system can use a flat radome because the incident signal radiates from a fixed location. In the case of a GPS system used to generate high precision location coordinates, the signals come from a constellation, typically, of at least 5 satellites that are located between approximately 20 degrees above the horizon all the way to directly overhead. Therefore to achieve optimum performance, the radomes herein are shaped with a curvature that minimizes signal reflections. As shown in the example reflection signal of FIG. 25, an incoming RF signal that is not orthogonal to the surface 2505 is reflected. As shown in FIG. 27, when there is a flat radome, only one angle exists for orthogonal penetration. With the domed radome of FIG. 26, many more angles exist for orthogonal penetration. Under ideal conditions, a 10 to 20% improvement in RF reception can be achieved when using a domed radome. This 10 to 20% improvement in RF reception provided by the use of a domed radome provides a decrease in a calculation time for measurements made by the device 100, 200, 300, 400, 500.

The built-in touch sensitive flat panel display 120 displays measurements derived by the GPS receiver and has the ability to take screen shots for later viewing. In one exemplary embodiment, the screen shot picture files are encrypted in order to ensure validity. In one exemplary embodiment, a code is used to encrypt a ".bmp" file in order to authenticate the screen shot. In addition to the screen shot, a text file with the raw data can also be provided. A user of the device 100, 200, 300, 400, 500 can view files on the display 120, for example so that the user can check what was done, e.g., verify that the job was done correctly, before climbing down. In addition, validation software can be used when files from the device 100, 200, 300, 400, 500 are uploaded from the device. The validation software can be used to verify that the results are actually from the device with the encryption code used for authentication.

A file menu of the device is presented on the display and is used to recall or review previously saved screen shots or reports to verify that the input data is correct. The input data can be, but is not limited to, antenna identifying information. The antenna identifying information can be an antenna site/location, an antenna sector, and/or an antenna position.

In prior art devices, the data is saved and post-processed later. Thus, users of prior art devices would not be aware of any mistakes that were made until after they left the site.

In one exemplary embodiment, device 100 has an improved GPS Performance/Boost mode, which reduces system noise in order to increase GPS performance. Every component, e.g., battery, display, etc., of the device 100, 200, 300, 400, 500 emits a certain level of radiation. This emitted radiation causes a long delay in determining the azimuth. The present device 100, 200, 300, 400, 500 provides a GPS boost mode that reduces noise in the entire system 100 to make a GPS signal stronger. This mode allows the determination of the azimuth (bearing) in approximately 30 seconds instead of 2 to 5 minutes. In one exemplary embodiment, the device 100, 200, 300, 400, 500 reduces processor speed, no longer accesses random access memory (RAM), and lowers current consumption to reduce the noise of the entire system and improve GPS reception.

Figure 3:
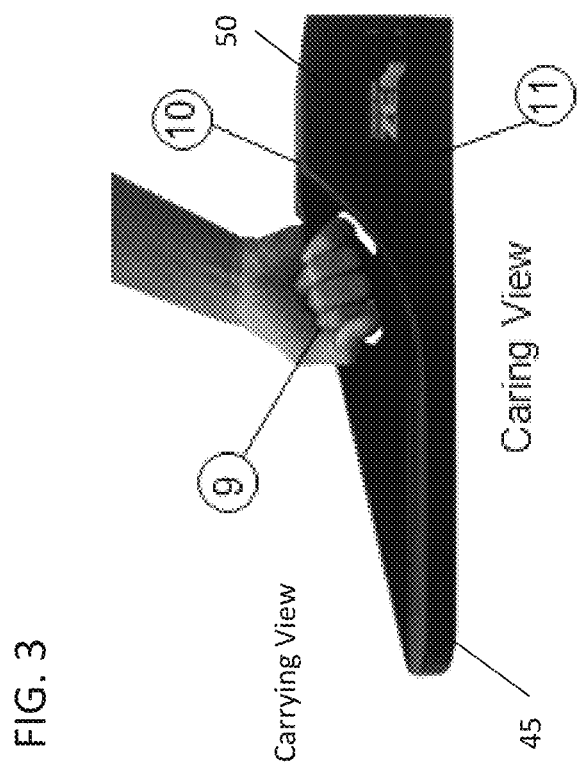
FIG. 3 is a right side elevational view of the enclosure of FIG. 2.
Figure 4:
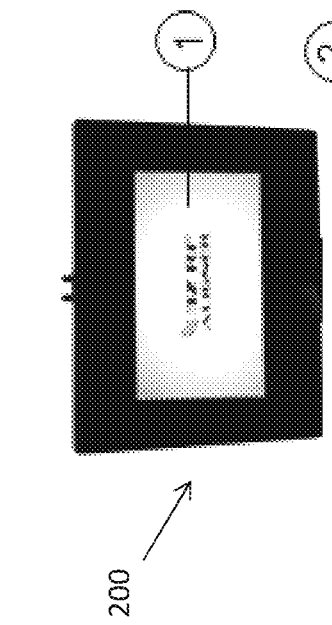
FIG. 4 is a top perspective view of the enclosure of FIG. 2.
Figure 5:
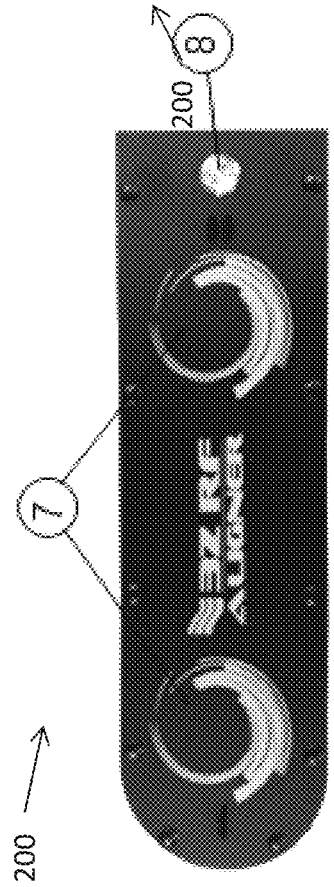
FIG. 5 is a right side elevational view of the enclosure of FIG. 2 held by a user.
Figure 6:
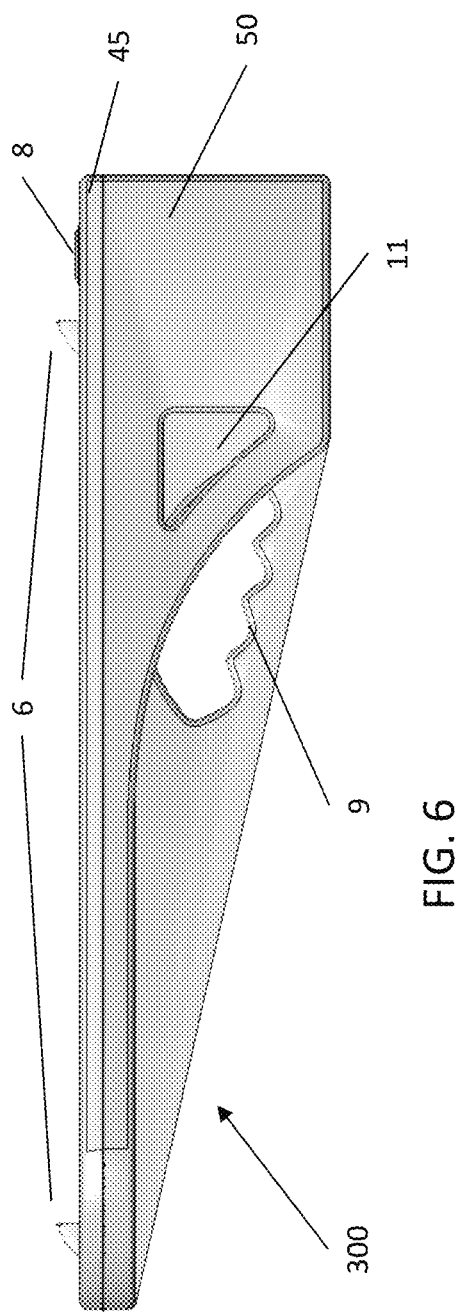
FIG. 6 is a left side elevational view of a second exemplary embodiment of the enclosure of the alignment device of FIG. 1.
Figure 7:
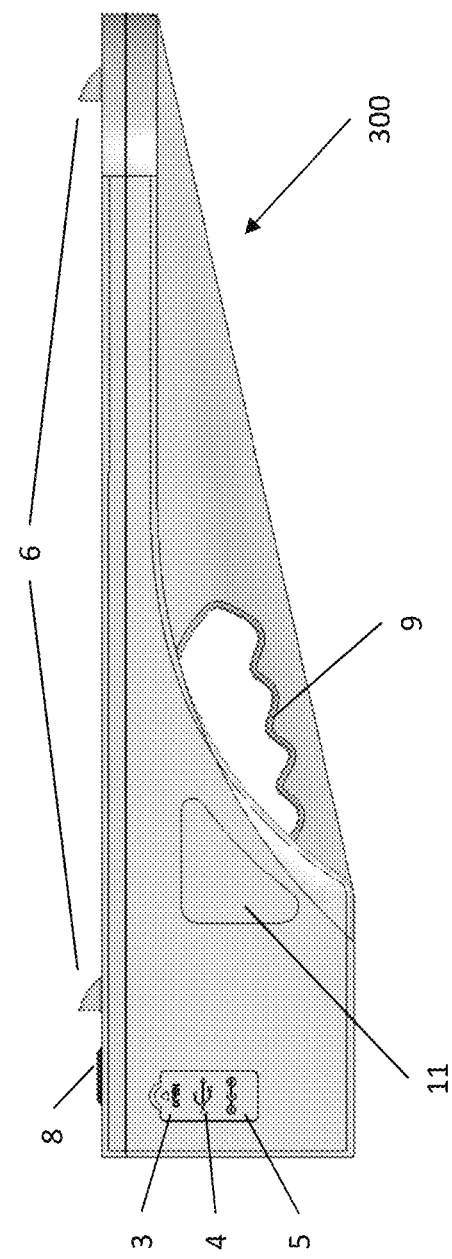
FIG. 7 is a right side elevational view of the enclosure of FIG. 6.
Figure 8:
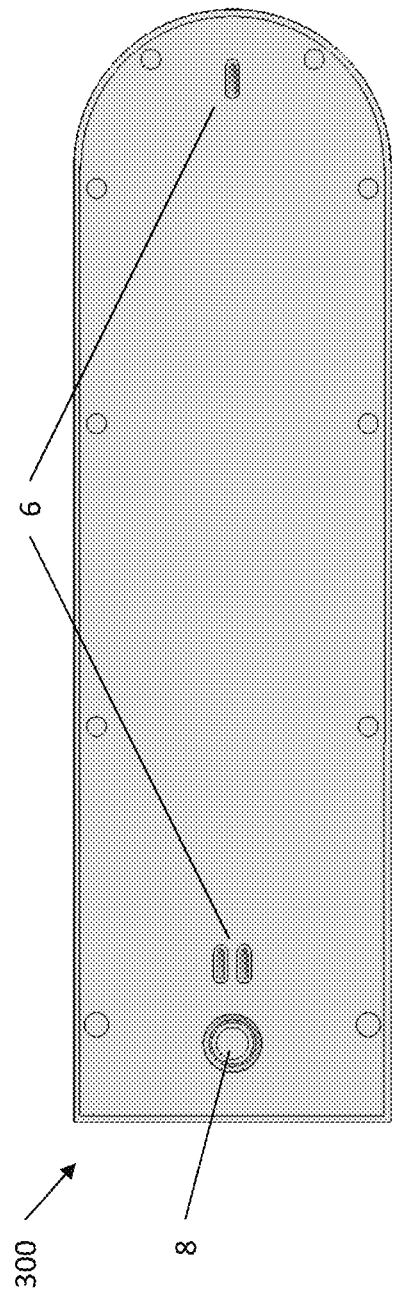
FIG. 8 is a top plan view of the enclosure of FIG. 6.
Figure 9:
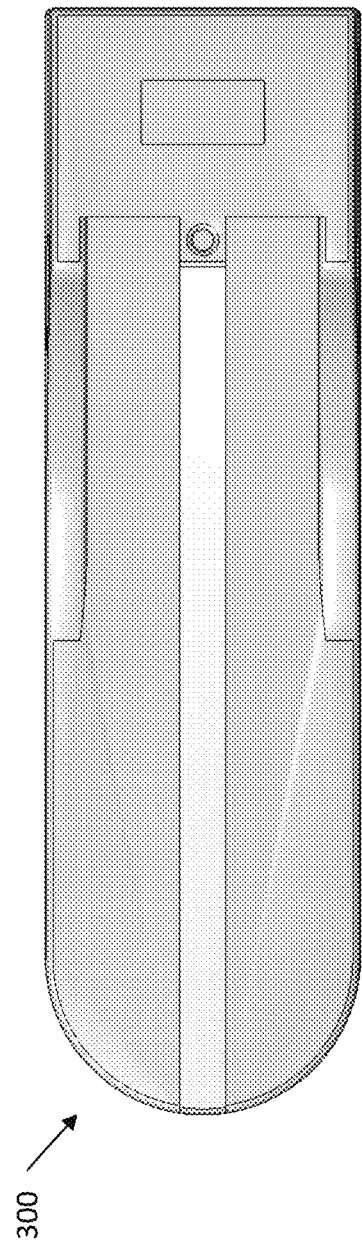
FIG. 9 is a bottom plan view of the enclosure of FIG. 6.
Figure 11:
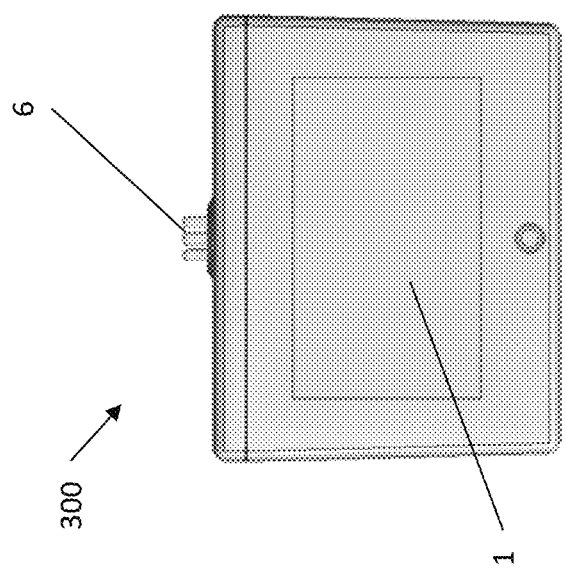
FIG. 11 is a rear elevational view of the enclosure of FIG. 6.
Figure 10:
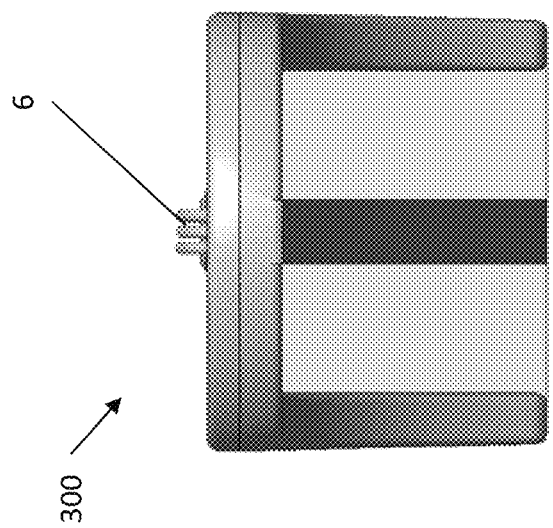
FIG. 10 is a front elevational view of the enclosure of FIG. 6.

In one exemplary embodiment, the device 100, 200, 300, 500 can be used on the ground as a surveying tool using sighting guides 6 of FIG. 3.

In one exemplary embodiment, device 100, 200, 300, 400, 500 can be used to provide information that can be used in windmill technology. Device 100, 200, 300, 400, 500 provides a correct reference for a first wind reading. Device 100, 200, 300, 400, 500 is used as a compass so that the windmill can be moved in the direction of the wind.

In operation, device 100, 200, 300, 400, 500 interprets data received from the GPS. The device 100, 200, 300, 400, 500 can be used to align antennas and microwave dishes.

When the device 100, 200, 300, 400, 500 is used to align microwave dish antennas, example calculations provided by the device may include azimuth, tilt, and distance. An accelerometer of the GPS receiver 110 is used to measure tilt. Given the latitude/longitude/height of the receiving dish, device 100, 200, 300, 400 calculates the azimuth and tilt, and also shows the distance, i.e., between the device (where are first dish is to be placed/aligned) and a second dish in a different location.

For a given position (e.g., latitude/longitude) and height above sea level, the device 100, 200, 300, 400, 500 can calculate the direction between two points. For example, when the device 100, 200, 300, 400, 500 is at a first point, the latitude/longitude and height are read and known by the device. The latitude/longitude and height for a second point can be provided as input to the device. From the information known for the first point and input for the second point, the device 100, 200, 300, 400, 500 can calculate azimuth and tilt. In one exemplary embodiment, azimuth, tilt, and distance, can be shown to the user on the display 1, 120.

In one exemplary embodiment, opening 23 also includes a memory slot, e.g., a micro SD slot. Placing a memory slot in opening 23 allows a memory card to be replaced from the outside.

In one exemplary embodiment, measurements are averaged rather than taking instantaneous measurements. For example, a particular measurement by device 100, 200, 300, 400, 500 can be the average of 100 measurements.

In one embodiment, device 100, 200, 300, 400, 500 includes a calibration feature. Then the system is turned on, a GPS date is read as "day 1" and an expiration date calculated from "day 1" can be printed on every screen shot of displayed measurements taken from the device 100, 200, 300, 400, 500.

Using prior art devices, it is difficult to align microwave dishes because the operator cannot see the second point. Possible obstructions to seeing the second point include fog, buildings, etc. Prior art methods for aligning microwave dishes used balloons, lasers, flags, two teams using signal strength meters, and other methods to assist in aligning the microwave dish. Using the alignment device of the present disclosure, the second point does not have to be visible in order to properly align the microwave dishes.

In a further exemplary embodiment, a device 500 is provided. Device 500 can include all of the features and variations set forth above with regard to devices 100, 200, 300, and/or 400 and, therefore, all such features and variations are not completely repeated hereinbelow. Where some features and variation do appear, even though they may be discussed above, they are not to be treated as limited to only the features and variations expressly stated and, instead, can be utilized or not utilized and/or combined in any way as described in any exemplary embodiment herein or equivalents thereto.

The enclosure 501 of the device 500 can be similar to other exemplary embodiments to include a top portion 45, 55 and a bottom portion 50, 60, as shown in FIGS. 28 to 30. In the exemplary embodiment, the top portion 45, 55 of the enclosure 501 includes one or more domes, here, two domes 13, 14. The two domes 13, 14 correspond to, and are situated above, a respective non-illustrated GPS antenna 125 within the enclosure 501. GPS antennas 125 are used along with the GPS receiver 110 so that the device 500 can calculate and display azimuth, latitude, longitude, height, date, and time. In this exemplary embodiment, the top portion 45, 55, e.g., the cover of the enclosure 501, is a single piece. Thus, the top portion 45, 55 can be considered a single radome. As in the other exemplary embodiments, the device 500 has a very sensitive GPS or GNSS compass associated with the GPS antennas 125 that is accurate to within ¾ of a degree, which is referred to in the art as high-precision GPS or high-precision GNSS. As used herein, GNSS is equally applicable in each instance where GPS is mentioned and, therefore, they are used interchangeably.

If desired, the area where the top portion 45, 55 and the bottom portion 50, 60 of the enclosure 501 meet can be covered by the bumper 65, which is used to protect and ruggedize the enclosure 501. In an exemplary embodiment, the enclosure 501 has an attachment mechanism to keep the enclosure 501 from falling. The attachment mechanism has one or more openings, e.g., carabiner attachment 11, 21 for attaching a lanyard or rope that is used to tie off or tie-down the device 500 in case of an accidental drop. In an exemplary embodiment, the enclosure 500 has a built-in handle 9, 19 for carrying the device 500. As will be described in further below, the exemplary embodiment of the enclosure 501 does not need to have built-in sighting notches 6 (although they could be provided if desired).

Desirably, the display 520 is placed or secured within a chamber of the enclosure 500 (e.g., space 31) and that chamber is shielded to reduce the amount of noise affecting the GPS system/readings. In one exemplary embodiment, the chamber is painted with copper paint to shield the emissions radiated from the display 520 and thereby reduce interference with the GPS. In an exemplary embodiment, wiring internal to the enclosure 501 for the On/Off switch 8, 130 is also shielded. In one exemplary embodiment, a protective screen is attached to the display 1, 120, 520 for waterproofing. For example, the screen can attached using double-sided tape, e.g., 3M VHD tape.

In an exemplary embodiment, enclosure 501 has a built-in USB communication port 4 that can be used to retrieve saved measurement reports and to update firmware. The enclosure 500 also has a built-in battery charging port 5 that is used to charge the battery. In one exemplary embodiment, the battery may be a lithium ion battery. The USB communication port and battery charging port are coupled to circuit board 105. The enclosure 500 has a built-in on and off push button. In one embodiment, the enclosure 500 has a rubber cover 3 that is used to protect the USB and charging ports from dust and moisture. Although not shown in the enclosure 500, the rubber cover 3, the built-in USB communication port 4, and the built-in battery charging port 5, can be included in opening 23.

The exemplary embodiments of the device 100, 200, 300, 400 rely on the processing of GPS data to assist the user in pointing the device 100, 200, 300, 400 in a desired direction, e.g., for aligning an antenna. One part of the display shows the actual heading of the device and either the user can know the desired heading or another part of the display can display the desired heading. When the variables match, the actual heading is the desired heading and alignment is achieved. At that time, the user can take the screen shot of the display as described herein for alignment verification.

Figure 31:
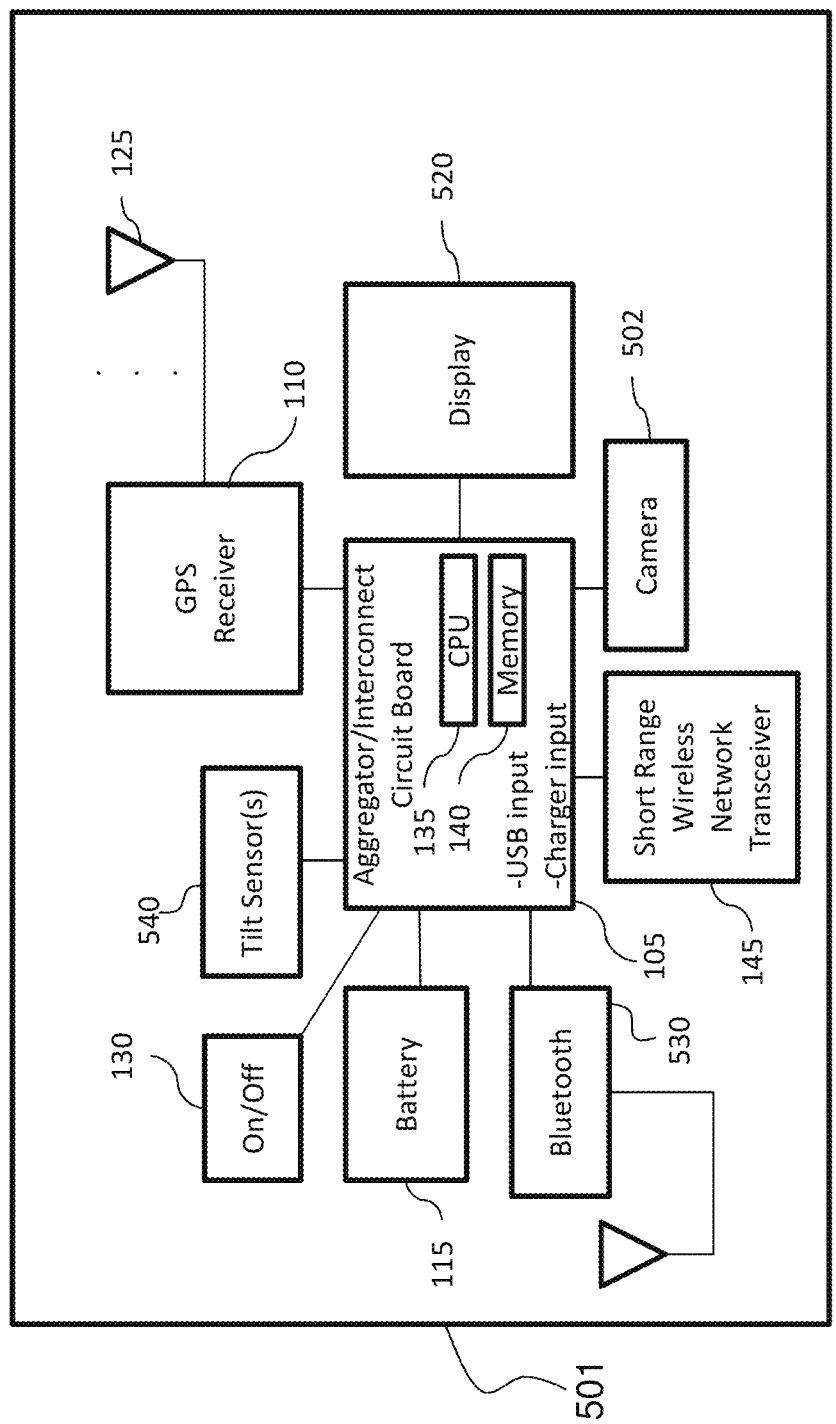
FIG. 31 is a block circuit diagram of an exemplary embodiment of the alignment device of FIG. 28.

When the device is used to align, the primary way for the user to visualize the current or final direction is, for example, to align the sighting notches 6 and look to where the sighting notches point. If the user can see the target location, then the user can move the device to have the sighting notches point at the target. Then, the numbers on the display can be used to fine-tune the alignment and have the actual heading of the device match the desired heading. While this confirmatory visualization is adequate, it is slow. The device 500 improves upon the aforementioned devices by adding a sighting camera 502 that is able to be displayed either on the built-in touch sensitive flat panel display 1, 120, 520 or on a hand-held display device, such as a smartphone or tablet. Communication to the latter can be accomplished, for example, by connecting the smartphone to the circuit board through a hard-wire, such as a USB cable connected to the port 4, or by including a Bluetooth communications device 530 connected to the circuit board 105, as shown in the block diagram of FIG. 31, and adding appropriate software to the memory 140 to be executed by the CPU 135 in a manner known to those of skill in the art. Accordingly, when describing that information (e.g., data, pictures, video) is shown on a display, that description is not limited only to the display on the enclosure but includes either of the displays on the enclosure and on the hand-held device or both, as simultaneous display is equally possible instead of just display on one or the other. Descriptions of displaying such information on the hand-held display device in addition to the display on the enclosure is not repeated herein for reasons of brevity and to eliminate repetition.

In the exemplary embodiment of FIGS. 28 to 30, the camera 502 is located at a front surface of the enclosure 501. In particular, at a centerpoint 503 of the front face. As shown in the block diagram of FIG. 31, the enclosure 501 includes therein all components needed for the alignment device 500, including the camera 502, which is connected to the circuit board 105 in this exemplary embodiment. In a manner known to those of skill in the art, whatever can be viewed by the camera 502 can be shown to the user on the display 520 located, in this exemplary embodiment, at the rear of the enclosure 501, and/or it can be transmitted to a hand-held display, such as a smartphone or tablet (e.g., by wire or wireless).

As set forth above, the GPS receiver 110 and the one or more GPS antennas 125 enable the device 500 to calculate or determine at least azimuth, latitude, longitude, height, date, and time and to show all or some of these variables on the display 520. While GPS can determine tilt of the enclosure 501, the addition of tilt sensors 540 connected to the circuit board 105 allows another precise measurement of localized orientation of the enclosure 501. In the exemplary embodiment, the camera 502 is aligned with the tilt sensors 540, which communicate with the circuit board 105 and, along with the GPS antennas 125, allow the device 500 to know where it is oriented in space and, therefore, where the tilt, roll, and azimuth axes of the enclosure are pointing.

Figure 32:
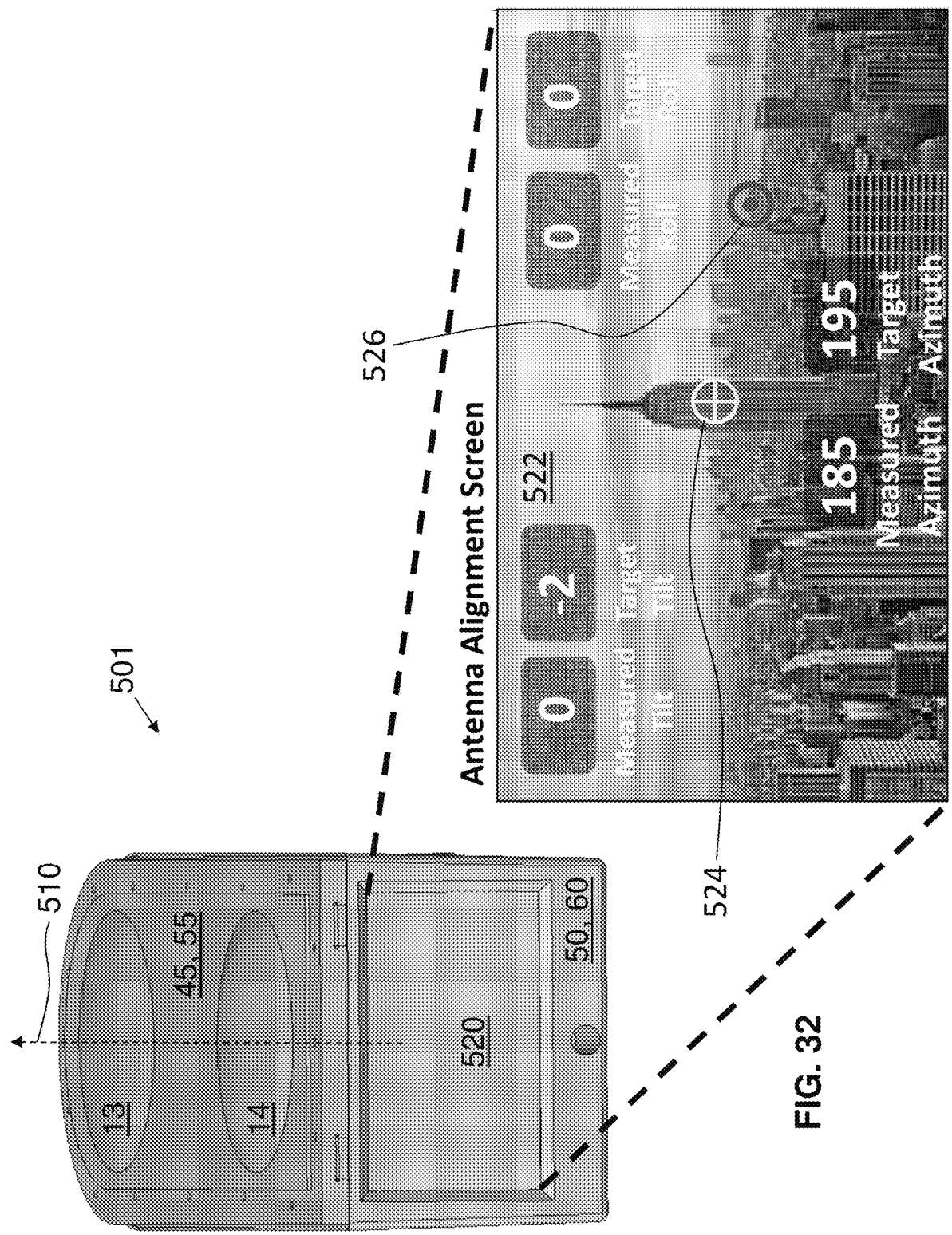
FIG. 32 is a perspective view from above the rear of the alignment device of FIG. 28 with an expanded view of an exemplary embodiment of a screen for aligning an antenna with a target azimuth, roll, and tilt.

In a particular exemplary embodiment, the roll axis 504 of the enclosure 501 passes orthogonally through the center of the camera eye and the X- and Y-axes of the camera's detector are co-planar with the vertical plane 506 and the horizontal plane 508 of the enclosure 501, these planes 506, 508 intersecting at the roll axis 504. As such, when the enclosure 501 is rotated about the roll axis 504, what is viewed by the camera corresponds exactly to the roll axis 504 of the enclosure 501. This means that the heading 510 of the device 500 corresponds exactly to the centerpoint of the area viewed by the camera 502 and shown on the display 520 when the entire area detected by the camera 502 fills the area of the display 520. The centerpoint of the area can be illuminated with an indicator 524, which is shown in FIG. 32, for example, as a yellow crosshairs. In this configuration, a position of the crosshairs will always remain in the center of the screen to visually indicate to the user the exact location where the camera 502 and the device 500 are pointing.

As in the exemplary embodiments described herein, the display 520 shows measurements derived by any of the devices connected to the circuit board 105 and has the ability to take screen shots for later viewing. In an exemplary embodiment, the screen shot picture files are encrypted in order to ensure validity. In an exemplary embodiment, a code is used to encrypt a ".bmp" file in order to authenticate the screen shot. In addition to the screen shot, a text file with the relevant raw data can also be provided. A user of the device 500 can view files on the display 520, for example, so that the user can check what alignment was performed, e.g., to verify that the alignment job was done correctly before climbing down from the antenna. In addition, validation software can be used when files from the device 500 are uploaded externally, for example, to the Internet through a wired or wireless connection. The validation software can be used to verify that the results are actually from the device 500 that took the picture/measurements with the encryption code used for authentication.

For a given position (e.g., latitude/longitude) and height above sea level, the device 500 can calculate a direction between two points. For example, when the device 500 is at a first point, the latitude/longitude and height are read and known by the device 500. The latitude/longitude and height for a second point can be provided as input to the device 500, for example, through the touch-screen display on a non-illustrated input screen. From the information known for the first point and the user input for the second point, the device 500 can calculate azimuth and tilt. In one exemplary embodiment, azimuth, tilt, and distance, can be shown to the user on the display 520.

When the device 500 is used to align microwave dish antennas, for example, calculations provided by the device 500 may include azimuth, tilt, and distance, for example. An accelerometer of the GPS receiver 110 is used to measure tilt with or without the tilt sensors 540. Given the latitude/longitude/height of the receiving dish, the device 500 calculates the azimuth and tilt, and also shows the distance, e.g., between the device (where the first dish is to be placed/aligned) and a second dish in a different location.

Figure 33:
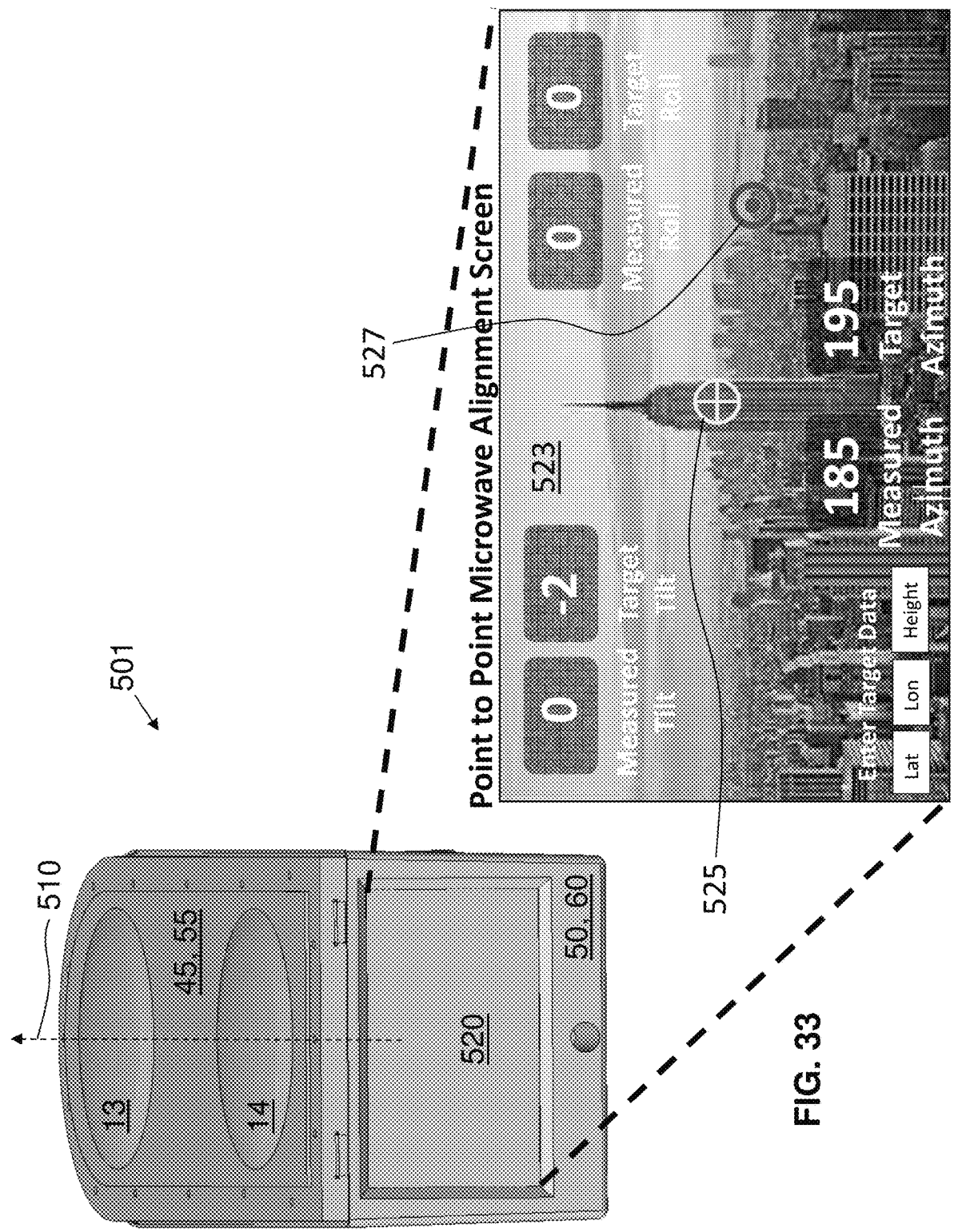
FIG. 33 is a perspective view from above the rear of the alignment device of FIG. 28 with an expanded view of an exemplary embodiment of a screen for point-to-point alignment of an antenna.

Knowing that all of these variables can be shown on the display 520, when combined with the camera 502 and an ability to physically view on the display 520 exactly where the camera 502 is pointing in real-time, actual alignment of the heading 510 of the enclosure 501 to a particular desired point in space becomes significantly easier. The following paragraphs in conjunction with FIGS. 32 and 33 show two ways of aligning the heading 510 to a desired point in space.

The first process for alignment is where the user is at a known point in space and wants to align a structure (e.g., an antenna) towards a target azimuth, tilt, and roll from that known point. This process is illustrated along with FIG. 32. Here, the device 500 is located at the known point and the user desires to orient the device 500 (which is temporarily fixed to the antenna to be aligned) to the target azimuth, tilt, and roll. In FIG. 32, the display (e.g., LCD, LED, OLED) is showing a picture 522 of what the camera 502 sees in real-time at the known point. The circuit measures and calculates azimuth, tilt, and roll of the enclosure 501 and, therefore, the heading 510. When the camera 502 is on, the circuit displays what the camera views on the display 520. A point on the earth to which the heading 510 is directed is indicated in FIG. 32 at the centerpoint of the display 520 with a yellow crosshairs 524. This point is an actual sighting 524 of the device 500. Before, during, or after obtaining this picture 522, the user enters the target azimuth, tilt, and roll. The circuit takes the entered target and determines a distance between the actual sighting 524 and the target. If this distance is sufficiently small enough to be within the view of the camera 502, then the circuit superimposes a target point 526 (e.g., as a red bullseye) onto the picture 522 being displayed. To align the device 500, the user needs to move the enclosure 501 so that the crosshairs 524 coincide with the bullseye 526. As the enclosure 501 moves, the circuit calculates the distance dynamically and moves the bullseye 526 either closer or further away from the crosshairs 524. It is the goal of the user to move the crosshairs 524 to align with/lay over the bullseye 526. Once this condition is met, the device 500 will be aligned to the target/goal alignment and, therefore, the antenna connected to the device 500 is also aligned to the target/goal alignment. As set forth herein, the terms bullseye and crosshairs do not need to be different shapes but can be the same shape, if desired. This embodiment of FIG. 32, for example, has the crosshairs as a plus sign within a circle and the bullseye as a dot centered within an outer annulus. If desired, the shapes can be reversed or the same and selected from any shape that allows the two to be displayed and overlaid so that alignment of the antenna can be made possible.

The second process for alignment is where the user is at a known point in space and wants to align a structure (e.g., an antenna) towards a target latitude, longitude, and height. This process is illustrated along with FIG. 33. Here, the device 500 is located at the known point and the user desires to orient the device 500 (which is temporarily fixed to the antenna to be aligned) to the target latitude, longitude, and height. In FIG. 33, the display (e.g., LCD, LED, OLED) is showing a picture 523 of what the camera 502 sees in real-time at the known point. The circuit measures and calculates azimuth, tilt, and roll of the enclosure 501 and, therefore, the heading 510. When the camera 502 is on, the circuit displays what the camera views on the display 520. A point on the earth to which the heading 510 is directed is indicated in FIG. 33 at the centerpoint of the display 520 with a yellow crosshairs. This point is an actual sighting 525 of the device 500. Before, during, or after obtaining this picture 523, the user enters the target latitude, longitude, and height. The circuit takes the entered target latitude, longitude, and height and, from the target latitude, longitude, and height, calculates a target azimuth, tilt, and roll and, from this, determines a distance between the actual sighting 525 and the target. If this distance is sufficiently small enough to be within the view of the camera 502, then the circuit superimposes a target point 527 (e.g., as a red bullseye) onto the picture 523 being displayed. To align the device 500, the user needs to move the enclosure 501 so that the crosshairs 525 coincide with the bullseye 527. As the enclosure 501 moves, the circuit calculates the distance dynamically and moves the bullseye 527 either closer to or further away from the crosshairs 525. It is the goal of the user to move the crosshairs 525 to align with/lay over the bullseye 527. Once this condition is met, the device 500 will be aligned to the target/goal alignment and, therefore, the antenna connected to the device 500 is also aligned to the target/goal alignment.

Figure 34:
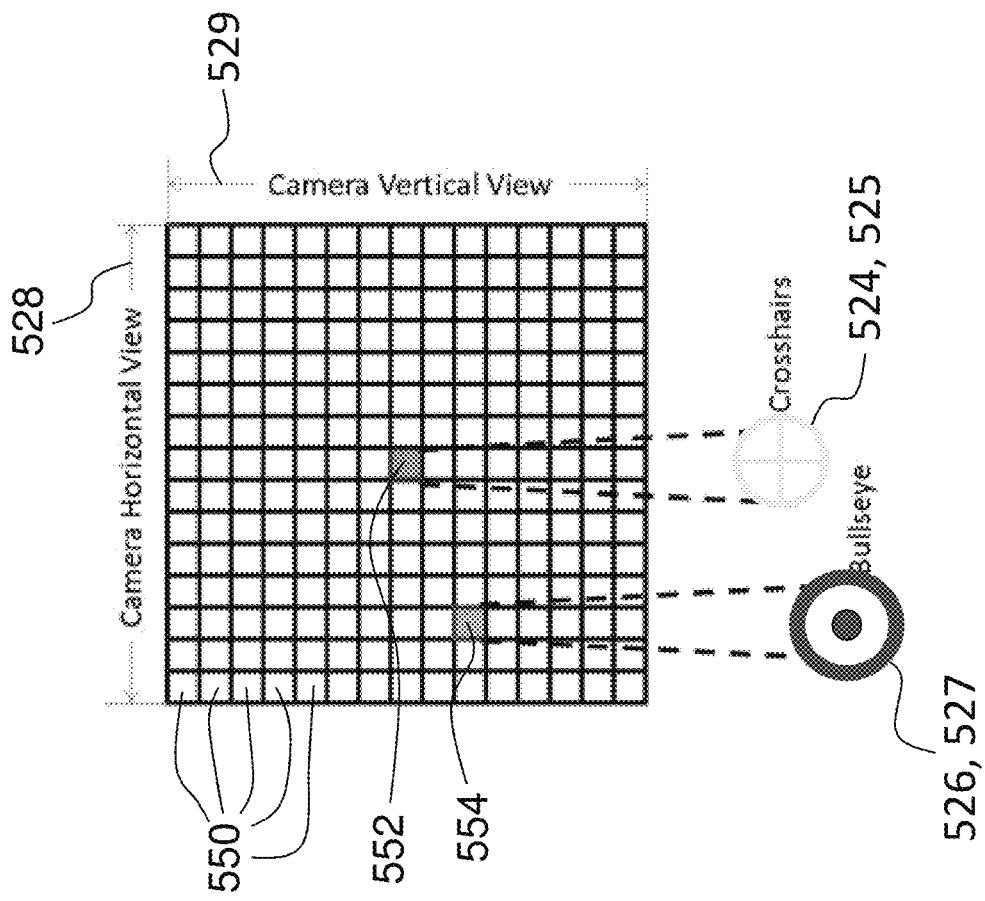
FIG. 34 is a diagrammatic illustration of an exemplary embodiment of a pixel map for a display screen or a portion of a display screen on which is placed a crosshairs and a bullseye.
Figure 35:
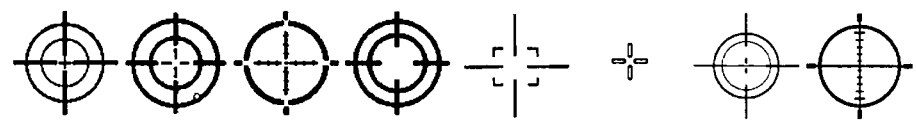
FIG. 35 illustrates exemplary embodiments of bullseye patterns.

In either of the alignment processes, the circuit is able to calculate where the target 526, 527 is based on knowing certain variables of the device 500. In particular, the device 500 (i.e., circuit) knows the camera's horizontal view in degrees, the camera's vertical view in degrees, a number of horizontal pixels in the view, a number of vertical pixels in the view, the target horizontal angle in degrees (azimuth), the target vertical angle in degrees (tilt), and the orientation of the enclosure (roll). Graphics software can be programmed to place the crosshairs 524, 525 at the centerpoint of the view and, using simple mathematical calculations, the software can be programmed to determine where to place the center of the bullseye 526, 527. This is referred to as a target coordinate. The diagram of FIG. 34 illustrates, diagrammatically, the horizontal view 528 and the vertical view 529 of the camera 502, which views 528, 529 form the picture 522, 523 made up of individual pixels 550. The crosshairs 524, 525 is centered on the pixel 552 located at the center of the picture 522, 523 (because the crosshairs is not the size of a single pixel in this exemplary embodiment, it is centered upon the pixel 552). In the exemplary embodiment of FIG. 34, the view 528, 529 is a square matrix of pixels 550, fifteen to a side (with a typical LED, LCD, etc. display screen, the number of pixels will be in the hundreds or thousands). Based on calculations utilizing the camera's horizontal and vertical views 528, 529, the number of horizontal and vertical pixels 550 in the view, and the target azimuth, tilt, and roll, the device 500 can calculate in which pixel 554 the center of the bullseye 526, 527 should be displayed and, as the enclosure 501 moves, where to move the bullseye 526, 527 as the user is trying to match the two together.

It is noted that "pixel" is used in the above example in its singular form. This word is not limited to a single pixel but can also be a group of pixels and the group can take any shape within the view.

In addition to the two-dimensional use of the bullseye and the crosshairs where both are relatively the same size, one can be smaller than the other. The smaller size can indicate three dimensional distance by being sized smaller if the target location is relatively far away from the viewer of the display. In such a case, when the bullseye is on the same view as the crosshairs, the camera (or software of the processor) can cause the view to zoom into the view and, as the zoom-in occurs, the smaller bullseye can enlarge as the user aligns the two shapes. The further the zoom-in occurs, the larger the bullseye becomes and the greater accuracy is obtained because the user is not just viewing a wide angle but, instead, is viewing a significantly smaller angle of view of the real space and, in fact, may be actually viewing the exact target location (e.g., the other antenna to which the current antenna is being aligned).

The enclosure 500 can, as above, have a mounting knob 2 that may, in one exemplary embodiment, comprise a single Pem-nut, for mounting to an antenna clamp or directly to an antenna. The mounting knob 2 can also be used to mount the device on a standard tri-pod or monopod. When the enclosure 500 is used on a standard tri-pod or monopod, the alignment device can be used on the ground to provide a rough verification for the device operator.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:
1. An antenna alignment device, comprising:
a handheld enclosure comprising:

a top portion comprising a single radome having a plurality of domes; and
a bottom portion, the top portion and the bottom portion being attached to form a single structure having therein:
at least one high-precision global positioning system (GPS) receiver;
a plurality of high-precision GPS antennas covered by the single radome and a respective dome of the plurality of domes, connected to the at least one high-precision GPS receiver, and spaced apart from one another along a line that defines an enclosure heading;
a display exposed to the environment on a surface of the structure and having a centerpoint;
a camera having a central axis aligned with the enclosure heading and, when operating, electronically outputting a view;
a user interface; and
an interconnect circuit board communicatively connected to the at least one high-precision GPS receiver, the plurality of high-precision GPS antennas, the display, the camera, and the user interface; and
wherein the circuit board has a processor programmed:
to determine an azimuth of the enclosure heading accurate at least to within approximately ¾ of a degree with the at least one high-precision GPS receiver and the plurality of high-precision GPS antennas based upon received GPS signals;
to show the view of the camera on the display;
to depict a crosshairs at the centerpoint of the display superimposed on the view being shown on the display to indicate to a user a location toward which the enclosure is pointing;
to receive a target coordinate from a user through the user interface;
to calculate a distance between the target coordinate and the enclosure heading and, if the distance is short enough to be contained within the view, to superimpose a bullseye upon the display at the target coordinate; and
to dynamically move the bullseye on the display as the user moves the enclosure.

2. The antenna alignment device according to claim 1, wherein:
the display is a touchscreen; and
the user interface comprises:
an on/off device at the enclosure; and
software-generated objects on the touchscreen and at least some user input is carried out through the touchscreen of the display.

3. The antenna alignment device according to claim 1, further comprising a second display on a computing device separate from the enclosure and communicatively connected to the processor, and the computing device being selected from a smartphone, a tablet, a laptop, a desktop computer, and an Internet connection.

4. The antenna alignment device according to claim 3, wherein the user interface comprises:
an on/off device at the enclosure; and
software-generated objects on the display and at least some user input is carried out through selecting the objects the display.

5. The antenna alignment device according to claim 3, wherein:
the second display is a touchscreen; and the user interface comprises:
an on/off device at the enclosure; and
the software-generated objects on the second display and at least some user input is carried out through selecting the objects the second display.

6. The antenna alignment device according to claim 1, wherein the processor is programmed to generate an electronic copy of the view when selected by the user.

7. The antenna alignment device according to claim 6, wherein the processor is programmed to generate a report based the electronic copy of the view to certify that no intermediate building or foliage blocks line-of-sight.

8. The antenna alignment device of claim 1, further comprising a shielded chamber within the enclosure in which is secured the display.

9. The antenna alignment device of claim 1, further comprising an attachment mechanism shaped to fix the enclosure to a structure and keep the antenna alignment device from falling.

10. The antenna alignment device of claim 1, wherein the enclosure further comprises:
a memory slot;
a universal serial bus (USB) port connected to the interconnect circuit board;
a battery connected to the interconnect circuit board; and
a battery charging port connected to the interconnect circuit board.

11. The antenna alignment device of claim 1, wherein the plurality of domes have a shape that improves RF reception between approximately 10% and approximately 20% and the improvement in RF reception decreases a calculation time for measurements by the processor.

12. An antenna alignment device, comprising:
a handheld enclosure comprising:
at least one high-precision global positioning system (GPS) receiver;
a plurality of high-precision GPS antennas connected to the at least one high-precision GPS receiver and spaced apart from one another along a line that defines an enclosure heading;
a display having a centerpoint;
a camera having a central axis aligned with the enclosure heading and, when operating, electronically outputting a view;
a user interface; and
an interconnect circuit board communicatively connected to the at least one high-precision GPS receiver, the plurality of high-precision GPS antennas, the display, the camera, and the user interface; and
wherein the circuit board has a processor programmed:
to determine an azimuth of the enclosure heading with the at least one high-precision GPS receiver and the plurality of high-precision GPS antennas based upon received GPS signals;
to show the view of the camera on the display;
to depict a crosshairs at the centerpoint of the display superimposed on the view being shown on the display to indicate to a user a location toward which the enclosure is pointing;
to receive a target coordinate from a user through the user interface;
to calculate a distance between the target coordinate and the enclosure heading and, if the distance is short enough to be contained within the view, to superimpose a bullseye upon the display at the target coordinate; and to dynamically move the bullseye on the display as the user moves the enclosure.

13. The antenna alignment device according to claim 12, wherein the display is attached to the enclosure and is exposed to the environment on a surface of the enclosure.

14. The antenna alignment device according to claim 13, wherein:
the display is a touchscreen; and
the user interface comprises:
an on/off device at the enclosure; and
software-generated objects on the touchscreen and at least some user input is carried out through the touchscreen of the display.

15. The antenna alignment device according to claim 12, wherein the display is on a computing device separate from the enclosure and communicatively connected to the processor, and the computing device is selected from a smartphone, a tablet, a laptop, a desktop computer, and an Internet connection.

16. The antenna alignment device according to claim 15, wherein the user interface comprises:
an on/off device at the enclosure; and
software-generated objects on the display and at least some user input is carried out through selecting the objects the display.

17. The antenna alignment device according to claim 15, wherein:
the display is a touchscreen; and
the user interface comprises:
an on/off device at the enclosure; and
the software-generated objects on the display and at least some user input is carried out through selecting the objects the display.

18. The antenna alignment device according to claim 12, wherein the processor is programmed to determine an azimuth of the enclosure heading accurate at least to within approximately of a degree with the at least one high-precision GPS receiver and the plurality of high-precision GPS antennas based upon the received GPS signals.

19. The antenna alignment device according to claim 12, wherein the processor is programmed to generate an electronic copy of the view when selected by the user and generate a report based the electronic copy of the view to certify that no intermediate building or foliage blocks line-of-sight.

* * * * *